US012657924B1

(12) United States Patent
Alsulamy et al.

(10) Patent No.: US 12,657,924 B1
(45) Date of Patent: Jun. 16, 2026

(54) INTELLIGENT SYSTEMS AND METHODS FOR PROXIMITY AND CONTACT DYNAMICS ASSESSMENT

(71) Applicant: Saudi Technology and Security Comprehensive Control Co. Ltd., Riyadh (SA)

(72) Inventors: Amal Ayadh Alsulamy, Riyadh (SA); Munirah Nasser AlYahya, Riyadh (SA)

(73) Assignee: Saudi Technology and Security Comprehensive Control Co. Ltd., Riyadh (SA)

( * ) Notice: Subject to any disclaimer, the term of this patent is extended or adjusted under 35 U.S.C. 154(b) by 0 days.

(21) Appl. No.: 19/376,410

(22) Filed: Oct. 31, 2025

(51) Int. Cl.
| | |
|---|---|
| *G06V 20/52* | (2022.01) |
| *G06T 7/292* | (2017.01) |
| *G06T 7/70* | (2017.01) |
| *G06V 10/25* | (2022.01) |
| *G06V 10/764* | (2022.01) |
| *G06V 40/10* | (2022.01) |

(52) U.S. Cl.
CPC .............. *G06V 20/52* (2022.01); *G06T 7/292* (2017.01); *G06T 7/70* (2017.01); *G06V 10/25* (2022.01); *G06V 10/764* (2022.01); *G06V 40/10* (2022.01); *G06T 2207/10016* (2013.01); *G06T 2207/30196* (2013.01); *G06T 2207/30232* (2013.01)

(58) Field of Classification Search
CPC ...... G06V 20/52; G06V 10/25; G06V 10/764; G06V 40/10; G06T 7/292; G06T 7/70; G06T 2207/10016; G06T 2207/30196; G06T 2207/30232
See application file for complete search history.

(56) References Cited

U.S. PATENT DOCUMENTS

| | | |
|---|---|---|
| 11,600,072 B2 | 3/2023 | Russo et al. |
| 2018/0075142 A1* | 3/2018 | Fridental .............. G06F 16/787 |
| 2025/0054338 A1* | 2/2025 | Dooley ................. G06V 40/20 |

FOREIGN PATENT DOCUMENTS

| | | |
|---|---|---|
| CN | 107239744 B | 12/2020 |
| JP | 4506381 B2 | 7/2010 |
| JP | 2020145648 A | 9/2020 |

OTHER PUBLICATIONS

He, Kaiming, et al. "Mask r-cnn." Proceedings of the IEEE international conference on computer vision. 2017. (Year: 2017).*

(Continued)

*Primary Examiner* — Andrew M Moyer
*Assistant Examiner* — Dylan John Mendez Muniz
(74) *Attorney, Agent, or Firm* — Baker & McKenzie LLP

(57) ABSTRACT

The disclosed method for tracking data objects, determining status of the data objects, and responsively controlling alert communications comprises: analyzing a real-time video stream using one or more multi-camera multi-object tracking (MCMOT) computing operations and one or more human-object interaction recognition (HOIR) computing operations to determine data statuses of one or more data objects identified and/or classified in the real-time video stream; updating, in a database, at least one status of a data object identified in the video stream; and initiating transmission, based on the status update of the identified data object, of an alert communication for transmission to one or more first computing devices or one or more second computing devices.

19 Claims, 7 Drawing Sheets

(56)     References Cited

OTHER PUBLICATIONS

Zhang, Mingxuan, et al. "Human-object-object interaction: Towards human-centric complex interaction detection." Proceedings of the 31st ACM International Conference on Multimedia. 2023. (Year: 2023).*

Wu, Weimei, et al. "Video Recognition-Based Emergency Event Early Warning System." 2025 5th International Conference on Machine Learning and Intelligent Systems Engineering (MLISE). IEEE, 2025. (Year: 2025).*

\* cited by examiner

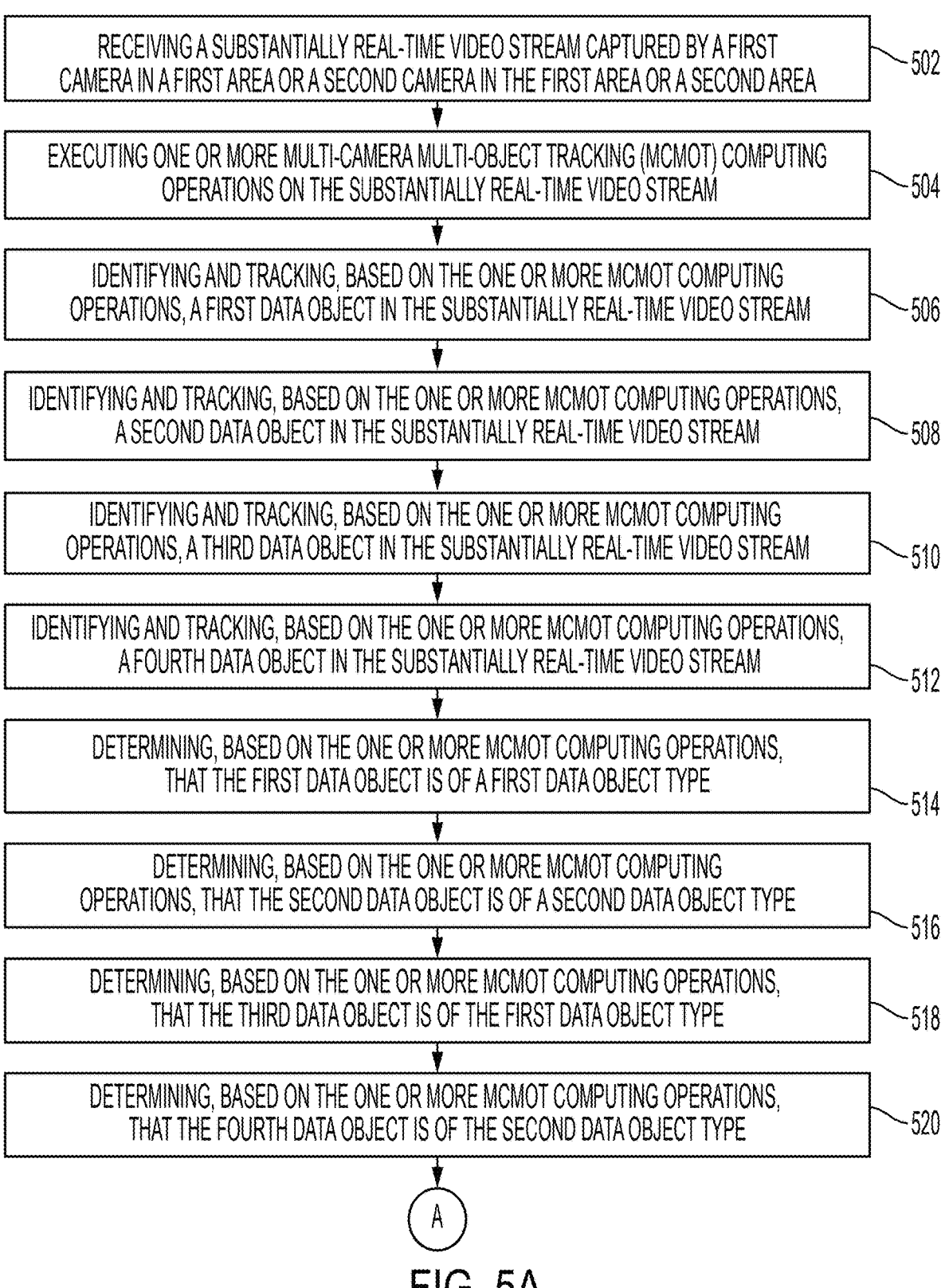

RECEIVING A SUBSTANTIALLY REAL-TIME VIDEO STREAM CAPTURED BY A FIRST CAMERA IN A FIRST AREA OR A SECOND CAMERA IN THE FIRST AREA OR A SECOND AREA ⎯502

EXECUTING ONE OR MORE MULTI-CAMERA MULTI-OBJECT TRACKING (MCMOT) COMPUTING OPERATIONS ON THE SUBSTANTIALLY REAL-TIME VIDEO STREAM ⎯504

IDENTIFYING AND TRACKING, BASED ON THE ONE OR MORE MCMOT COMPUTING OPERATIONS, A FIRST DATA OBJECT IN THE SUBSTANTIALLY REAL-TIME VIDEO STREAM ⎯506

IDENTIFYING AND TRACKING, BASED ON THE ONE OR MORE MCMOT COMPUTING OPERATIONS, A SECOND DATA OBJECT IN THE SUBSTANTIALLY REAL-TIME VIDEO STREAM ⎯508

IDENTIFYING AND TRACKING, BASED ON THE ONE OR MORE MCMOT COMPUTING OPERATIONS, A THIRD DATA OBJECT IN THE SUBSTANTIALLY REAL-TIME VIDEO STREAM ⎯510

IDENTIFYING AND TRACKING, BASED ON THE ONE OR MORE MCMOT COMPUTING OPERATIONS, A FOURTH DATA OBJECT IN THE SUBSTANTIALLY REAL-TIME VIDEO STREAM ⎯512

DETERMINING, BASED ON THE ONE OR MORE MCMOT COMPUTING OPERATIONS, THAT THE FIRST DATA OBJECT IS OF A FIRST DATA OBJECT TYPE ⎯514

DETERMINING, BASED ON THE ONE OR MORE MCMOT COMPUTING OPERATIONS, THAT THE SECOND DATA OBJECT IS OF A SECOND DATA OBJECT TYPE ⎯516

DETERMINING, BASED ON THE ONE OR MORE MCMOT COMPUTING OPERATIONS, THAT THE THIRD DATA OBJECT IS OF THE FIRST DATA OBJECT TYPE ⎯518

DETERMINING, BASED ON THE ONE OR MORE MCMOT COMPUTING OPERATIONS, THAT THE FOURTH DATA OBJECT IS OF THE SECOND DATA OBJECT TYPE ⎯520

INTELLIGENT SYSTEMS AND METHODS FOR PROXIMITY AND CONTACT DYNAMICS ASSESSMENT

FIELD OF DISCLOSURE

The present disclosure is directed to assessment of a substantially real-time video stream.

BACKGROUND

In recent years, the need for advanced safety and security systems has become increasingly important in public spaces, transportation hubs, and other high-traffic areas. There is therefore a need for a system that tracks and/or informs about data relationships in captured substantially real-time video streams.

SUMMARY

The disclosed methods and systems are directed to determining statuses of the data objects, and responsively controlling alert communications. According to an embodiment, a system for tracking data objects, determining statuses of the data objects, and responsively controlling alert communications comprises one or more computing databases; and one or more computing servers comprising one or more computing device processors and a memory storing instructions, the instructions being executable by the one or more computing device processors to: receive a substantially real-time video stream captured by a first camera in a first area or a second camera in the first area or a second area; execute one or more multi-camera multi-object tracking (MCMOT) computing operations on the substantially real-time video stream; identify and track, based on the one or more MCMOT computing operations, a first data object in the substantially real-time video stream; identify and track, based on the one or more MCMOT computing operations, a second data object in the substantially real-time video stream; identify and track, based on the one or more MCMOT computing operations, a third data object in the substantially real-time video stream; identify and track, based on the one or more MCMOT computing operations, a fourth data object in the substantially real-time video stream; determine, based on the one or more MCMOT computing operations, that the first data object is of a first data object type; determine, based on the one or more MCMOT computing operations, that the second data object is of a second data object type; determine, based on the one or more MCMOT computing operations, that the third data object is of the first data object type; determine, based on the one or more MCMOT computing operations, that the fourth data object is of the second data object type; execute one or more human-object interaction recognition (HOIR) computing operations on at least one of: the first data object, the second data object, the third data object, and the fourth data object, or the substantially real-time video stream; determine, based on the one or more HOIR computing operations, a first interaction associated with the first data object and the second data object; initiate storage of, first interaction data associated with the first interaction, in the one or more computing databases; determine, based on the one or more HOIR computing operations, a second interaction associated with the third data object and the fourth data object; initiate storage of, second interaction data associated with the second interaction, in the one or more computing databases; execute one or more first relationship computing operations on the first interaction data; execute one or more second relationship computing operations on the second interaction data; determine, based on the first interaction data, a first duration of the first interaction; determine, based on the first interaction data, the first interaction is of a first interaction type; determine, based on the second interaction data, a second duration of the second interaction; determine, based on the second interaction data, the second interaction is of a second interaction type; determine, based on the one or more first relationship computing operations, the first duration, and the first interaction type, that a first relationship between the first data object and the second data object is of a first relationship type; determine, based on the one or more second relationship computing operations, the second duration, and the second interaction type, that a second relationship between the third data object and the fourth data object is of a second relationship type; update, based on the first relationship type, a first status of the second data object, wherein the first status does not cause first initiation of an alert communication for transmission to one or more first computing devices; update, based on the second relationship type, a second status of the fourth data object, wherein the second status causes the first initiation of the alert communication for transmission to the one or more first computing devices or one or more second computing devices.

In other embodiments, a method and a computer program product can include or execute various data processing steps associated with the above system. These and other implementations may each optionally include one or more of the following features.

According to one embodiment, one or more of: the first data object is associated with a first person; the second data object is associated with a second person; the third data object is associated with a third person; the fourth data object is associated with a fourth person.

Additionally, the substantially real-time video stream can comprise: a fifth data object that is associated with a pet; and a sixth data object that is associated with an article.

In some implementations, the substantially real-time video stream captured by the first camera in the first area, or the second camera in the first area or the second area, is captured by one or more of: one or more first cameras configured to provide one or more first views of the first data object, the second data object, the third data object, and the fourth data object; and one or more second cameras configured to provide one or more second views of the first data object, the second data object, the third data object, and the fourth data object, the one or more second cameras being positioned to provide one or more substantially top-down views of the first data object, the second data object, the third data object, and the fourth data object.

In some cases, the first area or the second area is divided into a first number of regions comprising at least a first region and a second region. Furthermore, at least a first video stream of at least a first portion of the first region is captured by the first camera, and at least a second video stream of a second portion of the second region is captured by the second camera. Additionally, the one or more data units can also implement or facilitate implementing at least one of: enable tracking a fifth data object moving from the first region to the second region; synchronize the first video stream and the second video stream to a coordinate system for enabling the tracking; and calibrate the first video stream and the second video stream to the coordinate system for enabling the tracking.

According to some embodiments, the one or more data units: assign, based on the one or more MCMOT computing operations, a first data object type to the first data object; assign, based on the one or more MCMOT computing operations a first bounding box to the first data object; assign, based on the one or more MCMOT computing operations a first set of location coordinates to the first data object; and assign, based on the one or more MCMOT computing operations, a first identifier to the first data object.

It is appreciated that when the one or more data units assign, based on the one or more MCMOT computing operations, the first identifier to the first data object further, the one or more data units assign, based on the first bounding box, and based on the first data object type, the first identifier to the first data object.

It is further appreciated that the one or more data units can: assign an uninitialized status to the fourth data object; and update the second status of the fourth data object based on first duration information associated with the second relationship and first distance information associated with the second relationship.

In some instances, the one or more data units: track, based on the second status, the fourth data object, determine a third relationship between the fourth data object and a fifth data object; and update the second status of the fourth data object based on whether an identifier of the fifth data object is comprised in a data record associated with the fourth data object, the data record being stored in the one or more computing databases.

Moreover, the one or more data units can include, in the alert communication: location information associated with the fourth data object; appearance information associated with the fourth data object; and the second data type associated with the fourth data object.

Additionally, the one or more data engines can access recovery information associated with the fourth data object, the recovery information comprising at least one of: location information associated with a sixth data object linked to the fourth data object; appearance information associated with the sixth data object linked to the fourth data object; or facial information associated with the sixth data object linked to the fourth data object. In some cases, the sixth data object linked to the fourth data object has an identifier that is comprised in a data record associated with the fourth data object.

BRIEF DESCRIPTION OF THE DRAWINGS

This disclosure is illustrated byway of example, and not byway of limitation in the figures of the accompanying drawings in which like reference numerals are used to refer to similar elements. It is emphasized that various features may not be drawn to scale, and the dimensions of various features may be arbitrarily increased or reduced for clarity of discussion.

FIGS. 5A-5C show exemplary workflows associated with multi-object tracking for controlling alert communications.

DETAILED DESCRIPTION

Reference will now be made in detail to embodiments, examples of which are illustrated in the accompanying drawings and figures. In the following detailed description, numerous specific details are set forth in order to provide a thorough understanding of the disclosed subject-matter. However, it will be apparent to one of ordinary skill in the art that the methods and systems disclosed may be practiced without these specific details.

As used herein, the term "exemplary" or "illustrative" means "serving as an example, an instance, or an illustration." Any implementation described herein as exemplary or illustrative is not necessarily to be construed as advantageous and/or preferred over other embodiments. Unless the context requires otherwise, throughout the description and the claims, the word "comprise" and variations thereof, such as "comprises" and "comprising" are to be construed in an open, inclusive sense, i.e., as "including, but not limited to."

Furthermore, the terms substantially real-time and near real-time, as used herein, refer to a processing and response timeframe that is close to, but not necessarily equal to, instantaneous or true real-time. While true real-time implies a delay of zero, any practical digital system will have some inherent latency due to data processing, computation, and network transmission. Therefore, these terms describe a timeframe where this inherent latency is sufficiently short as to be negligible for the effective operation of a given process or for the perception of a human user. The specific duration considered to be substantially real-time or near real-time is application-dependent and is defined by the requirements of the system to function as intended without being materially compromised by the delay.

For example, in different embodiments of this disclosure, the acceptable delay can vary significantly. In the context of streaming interactive video or augmented reality, near real-time may correspond to a total latency of less than 200 milliseconds, as longer delays can become perceptible and disruptive to a user. Thus, these terms encompass any timeframe in which the system's response is delivered quickly enough to be relevant and actionable for its specific purpose.

Network Environment

Figure 1:
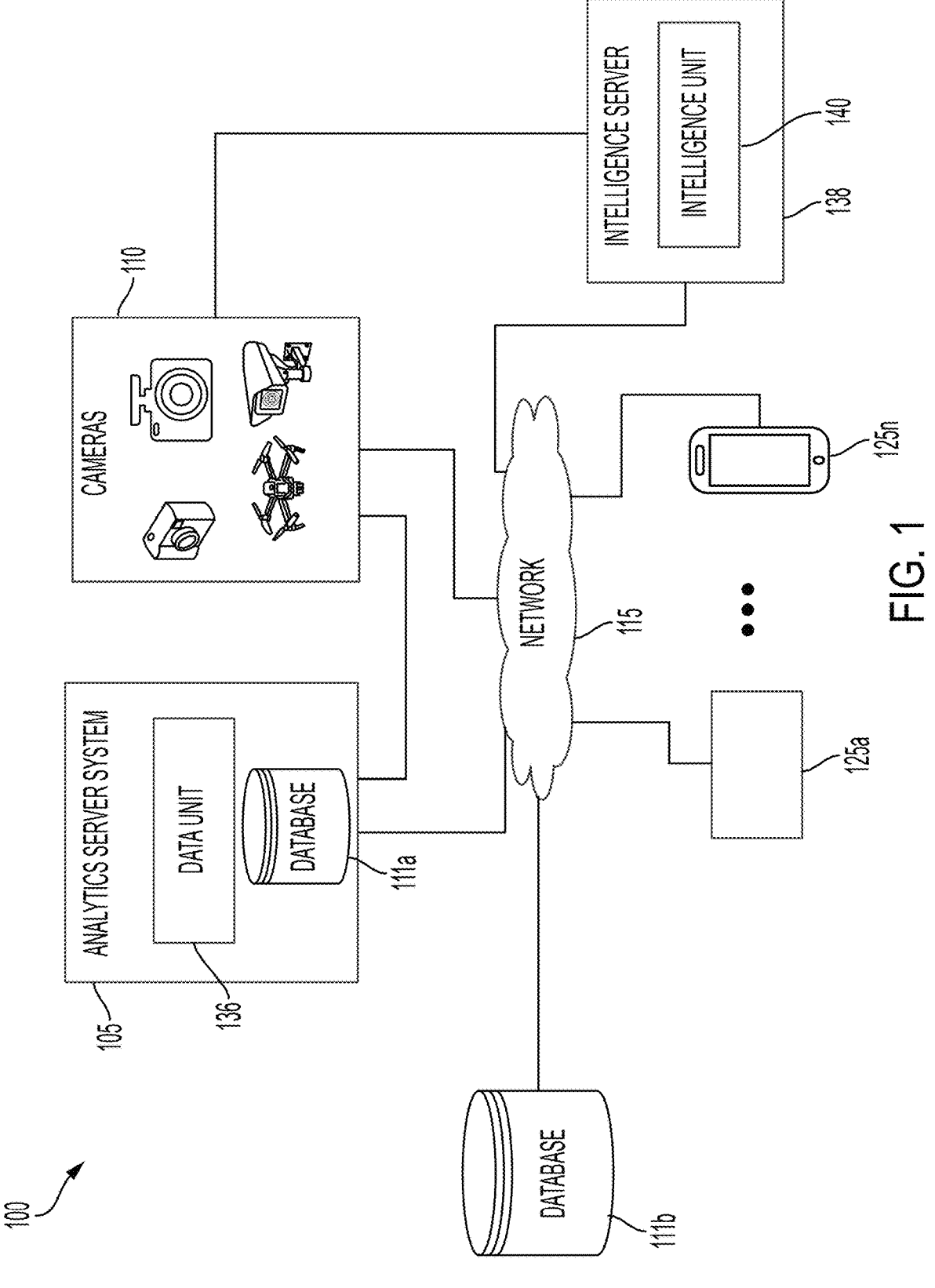
FIG. 1 shows an exemplary network system for executing the principles disclosed.

Shown in FIG. 1 is an exemplary network system 100 for executing the principles disclosed including multi-object tracking for controlling alert communications. For example, the multi-object tracking capabilities of the disclosed network system 100 can include detecting multiple data objects from a substantially real-time video stream to determine spatial and/or temporal data relationships including how close or proximal on data object is relative to another data object. In the illustrated implementation, the network system 100 includes an analytics server system 105, one or more cameras 110, one or more computing databases 111a and 111b, all of which are communicatively coupled to a network 115. Also connected to the network 115 are two or more endpoint devices 125a . . . 125n and an intelligence server 138.

It is appreciated that the implementation of the analytics server system 105 and/or the intelligence server 138 may be physically structured in various configurations. In one embodiment, the one or more computing device processors that execute the functions of the analytics server system 105 and/or the intelligence server 138 may be co-located at a single geographical location or housed within a single data center. Alternatively, the one or more computing device processors that execute the functions of the analytics server system 105 and/or the intelligence server 138 may be realized in a distributed computing environment, where multiple computing device processors are spread across disparate physical locations and are communicatively coupled over a network to operate in a coordinated or parallel fashion.

According to one embodiment, the analytics server system 105 includes a computing device such as a content server, a communication server, a laptop computer, a desktop computer, a handheld computing device, a tablet computing device, a virtual machine, a cloud-based computing system and/or a cloud-based service, and/or the like. The analytics server system 105 may include a plurality of computing devices configured to communicate with one another and/or communicate with other systems comprised in the network system 100 to implement the techniques described herein.

According to one embodiment, the analytics server system 105 comprises a data unit 136 (also referred to as one or more data units elsewhere herein) and at least one local computing database 111*a*. For example, results from implementing the disclosed methods may be stored in the local computing database 111*a* or in a remote computing database 111*b* that is physically distal (e.g., implemented in a first location that is different from a second location where the local computing database 111*a* is implemented). According to one embodiment, the local computing database 111*a* and the remote computing database 111*b* may include a non-volatile memory or similar permanent storage device and media. For example, the local computing database 111*a* and the remote computing database 111*b* can be a hard disk drive, a CD-ROM device, a DVD-ROM device, a DVD-RAM device, a DVD-RW device, a flash memory device, solid state media, or some other mass storage device known in the art for storing information on a more permanent basis.

Figure 2:
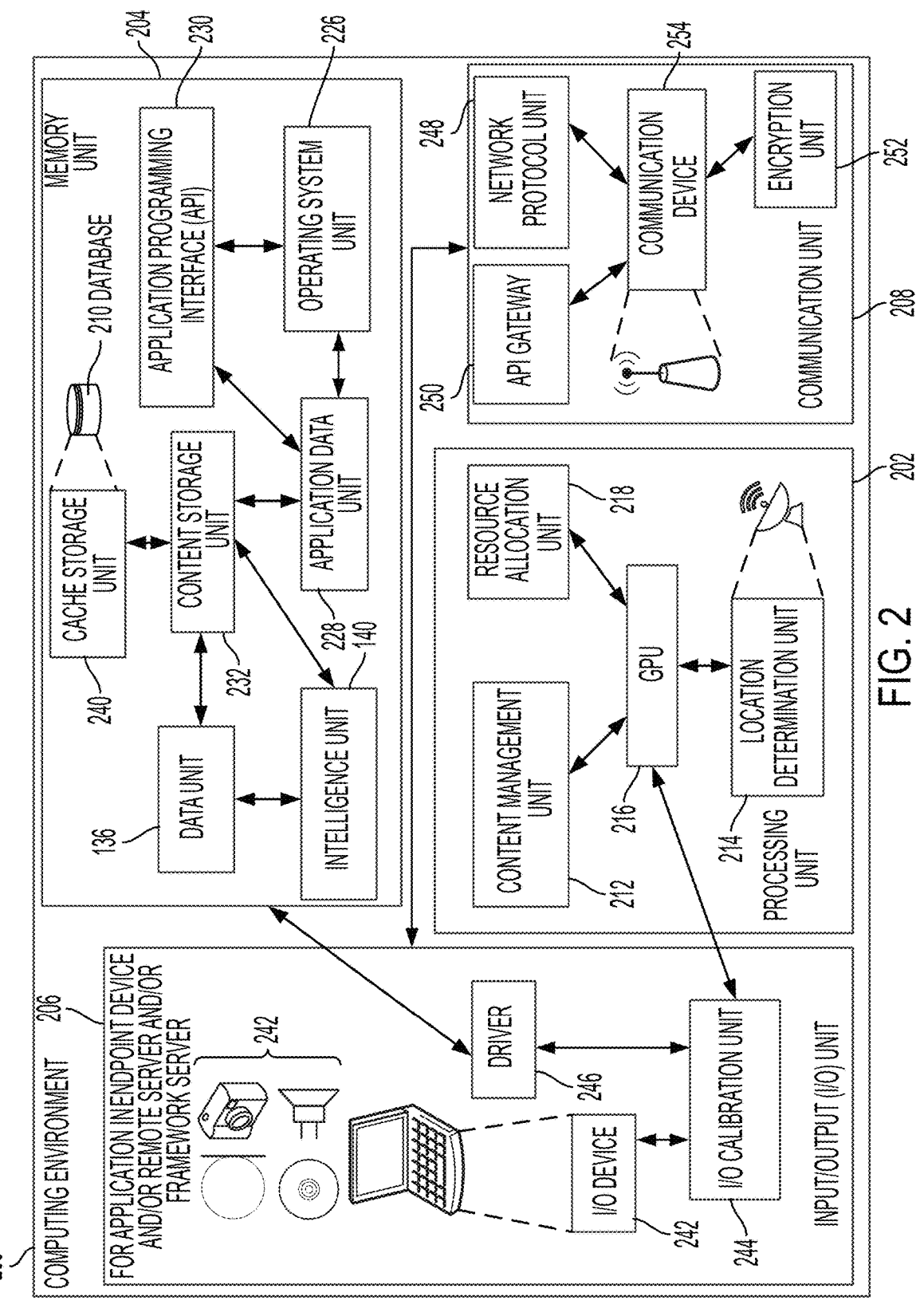
FIGS. 2 and 3 illustrate exemplary system and functional diagrams of a computing environment, within which one or more systems shown in FIG. 1 can be implemented.
Figure 3:
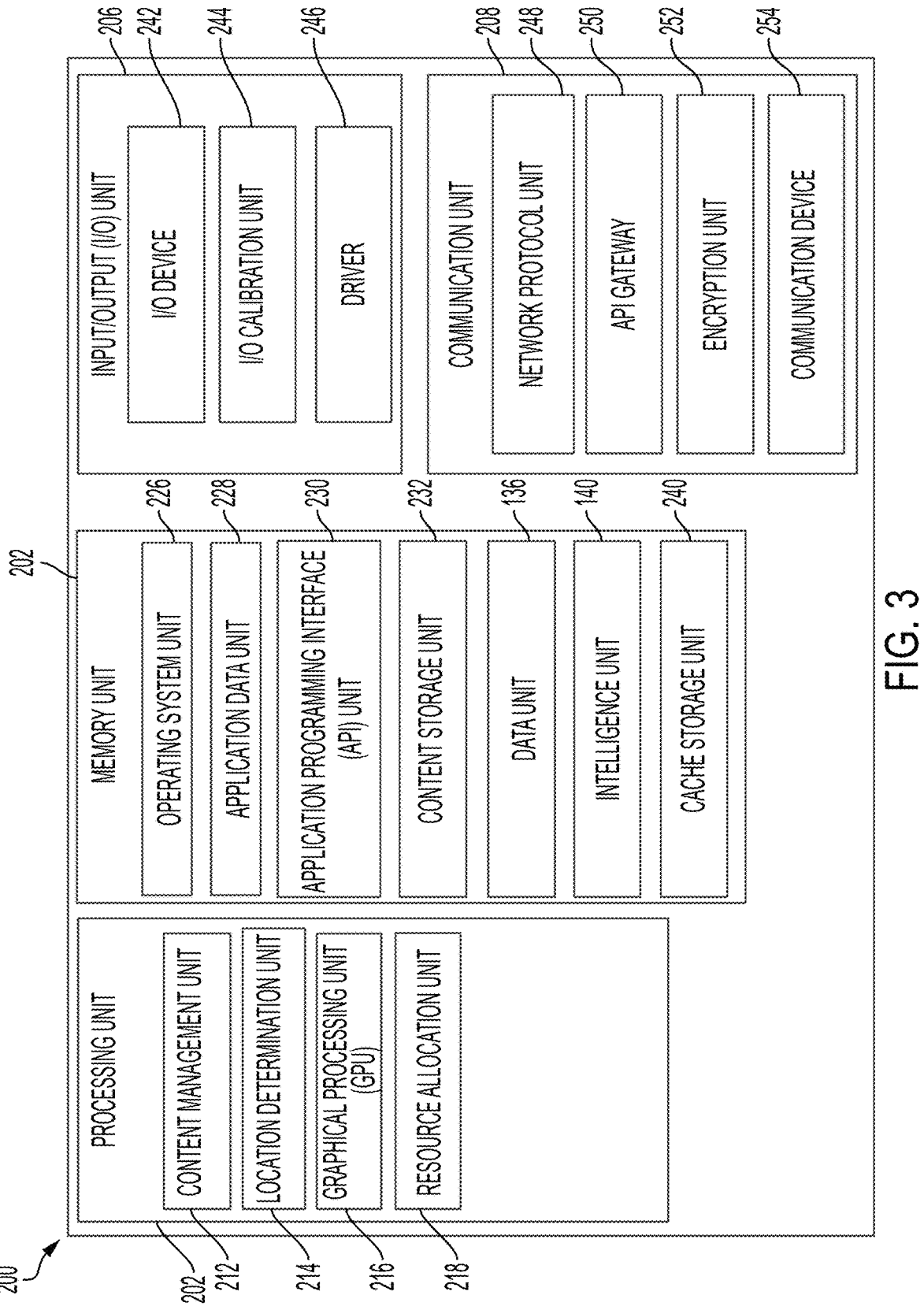

The data unit 136 referenced above may include one or more instructions or computer logic that are executed by the one or more processors such as the processors discussed in association with FIGS. 2 and 3. The data unit 136 referenced herein comprises an executable software module containing one or more instructions or computer-executable logic. These instructions are specifically configured to be executed by one or more processors, such as the processors discussed in association with FIGS. 2 and 3, to perform the disclosed steps. In particular, upon execution by said processors, the instructions within the data unit 136 causes a computing system to carry out the specific processing procedures, methods, techniques, and workflows provided in this disclosure. Thus, the data unit 136 represents a tangible software implementation that directs a computing device to function as a specialized machine for executing the disclosed method.

In an exemplary implementation, the one or more cameras 110 (e.g., image capture sensors) comprise a pair of synchronized or unsynchronized cameras with an overlapping field of view. For example, the pair of synchronized or unsynchronized cameras may be configured to monitor an area that is divided into n-regions with each region being monitored by one or both of the pair of synchronized or unsynchronized cameras. Furthermore, each pair of synchronized or unsynchronized cameras can comprise a first camera and a second camera. The first camera, for example, can be a high-angle camera configured to provide a clear view of an object in a field of view of the first camera and/or the second camera such that images of the object can be analyzed from multiple perspectives such as a top-view associated with the first camera, a side view associated with the second camera, etc. In addition, the first and/or second camera may be configured to implement occlusion mitigation computing operations that correct, compensate, or mitigate against negative effects of undesirable objects blocking the field of view of the first camera or the second camera.

According to one embodiment, the cameras 110 comprise n-pairs of cameras that are configured to continuously monitor the aforementioned n-regions and thereby locate, within an area of the n-regions, an object, capture images of said object, identify and/or classify data components of said object, and track a motive trajectory and/or motive transitions of the object from a first region comprised in the n-regions to a second region comprised in the n-regions.

As further discussed below, the analytics server system 105 may be configured to communicate with the one or more systems coupled to the network 115. This can include communications between the analytics server system 105 and the cameras 110 to transmit captured substantially real-time video stream to the intelligence server 138 to resolve, classify, and identify features of images of objects captured by the cameras 110. In addition, this communication can involve the transmission of one or more alerts from the analytics server system 105 to the two or more endpoint devices 125*a* . . . 125*n*.

In various embodiments, the cameras 110 may be configured with a range of hardware and deployment strategies to suit a particular application. For instance, the system may employ a homogeneous camera array, where all cameras 110 are of the same type, such as using several identical 4K dome security cameras to ensure consistent video quality across a given area being surveilled. Conversely, the cameras 110 may be based on a heterogeneous arrangement of different camera types, such as pairing a wide-angle optical camera for general scene awareness with a specialized thermal imaging camera to detect heat signatures or a high-zoom telephoto camera to capture fine details like specific features of an object from a distance. Furthermore, the physical placement of the cameras 110 can be centralized or distributed. A co-located deployment might involve mounting multiple cameras within a single housing unit on a utility pole, whereas a distributed deployment could involve positioning cameras at opposite corners of a given area, at various intersections throughout said area, or at all entry and exit points of said area to achieve comprehensive environmental coverage.

The operational nature of the cameras 110 may also vary, encompassing static and dynamic implementations. In some embodiments, the cameras 110 may be static, fitted to a fixed structure and secured to prevent any movement, such as a camera permanently bolted to a ceiling to monitor a given area's entrance. Other static cameras may be fitted to a fixed structure but secured in a way that allows for movement, such as a pan-tilt-zoom (PTZ) camera mounted on the exterior of a given area that can be remotely controlled to observe various angles of said area or follow objects of interest. In further embodiments, the cameras 110 may be dynamic, fitted to moving platforms or vehicles. Examples of such dynamic cameras include those mounted on unmanned aerial vehicles (drones), inspection cameras affixed to autonomous delivery robots or other vehicles in a given location, or dashcams integrated into vehicles.

It is appreciated that the two or more endpoint devices 125*a* . . . 125*n* can comprise handheld computing devices, smart phones, tablets, phablets, laptop computers, desktop computers, personal digital assistants (PDAs), smart devices, wearable electronic devices, biometric devices, computer servers, virtual servers, virtual machines, and/or communication servers. In some embodiments, the two or more endpoint devices 125*a*, . . . , 125*n* may include a plurality of computing devices configured to communicate with one another and/or receive/transmit data communications from/to the analytics server system 105 and/or the intelligence server 138. It is appreciated that one or more alert data communications (e.g., the aforementioned alerts) associated with executing one or more of the disclosed methods may be visualized on one or more display devices of the two or more endpoint devices 125a, . . . , 125n. In some cases, the two or more endpoint devices comprise a first endpoint device that is associated with the analytics server system 105. This first endpoint device, for example, can comprise an admin endpoint device configured to monitor, control, or otherwise regulate or validate various computing operations implemented in the network system 100. Furthermore, the two or more endpoint devices 125a, . . . , 125n can include a second endpoint device that may be dependent or independent from the analytics server system 105. This second endpoint point device, for example, may be associated with a security system configured to support or implement security operation in response to receiving an alert from the analytics server system 105. In addition, the one or more endpoint devices 125a, . . . , 125n may include a third endpoint device that is dependent or independent of the analytics server system 105. This third endpoint device may be associated with stakeholders associated one or more data profiles comprised in the computing databases 111a or 111b.

According to one embodiment, the analytics server system 105 can be coupled, via the network 115, to an intelligence server 138 configured to control or regulate, in conjunction with, or independent of the data unit 136, training of one or more computing models configured for implementing data classification and/or object identification computing operations. In some cases, the intelligence server 138 can comprise one or more intelligence units 140 that can implement computing operations such as: zero-shot learning computing operations; few-shot learning computing operations; and result/model fine-tuning computing operations. Additionally, or alternatively, one or more intelligent artificial intelligence (AI) models and/or machine learning (ML) models may comprise, or be based on at least one of: GPT-4, LLaMA-3, BLOOM, PaLM, GPT-3.5, BERT, Gemini, LaMDA, Perplexity, or Falcon. Additionally, or alternatively, one or more of the AI or ML models may also include multiple intelligence models and therefore may be configured to perform and/or execute multiple processes in parallel. In addition, the AI or ML models disclosed may include various artificial intelligence systems or structures, including but not limited to large language models (LLMs), deep learning models, machine learning models, neural networks (e.g., convolutional neural networks (CNNs), recurrent neural networks (RNNs), transformers), expert systems, decision trees, and reinforcement learning models.

Additionally, or alternatively, one or more of the AI/ML models may also include multiple intelligence models (e.g., separately trained intelligence models) and therefore may be configured to perform and/or execute multiple processes in parallel. In some embodiments, the intelligence server 138 may include a special chipset for processing large amounts of data and/or complex computing operations in a reduced amount of time. These chipsets may include, but are not limited to, Graphics Processing Units (GPUs), Tensor Processing Units (TPUs), Field-Programmable Gate Arrays (FPGAs), Application-Specific Integrated Circuits (ASICs) specifically designed for artificial intelligence (AI) workloads, or neuromorphic chips. Such chipsets can be configured to have parallel computing architectures, enabling efficient execution of matrix multiplications and convolutions, which comprise computing operations in a given intelligence model, particularly deep learning models. This parallel processing capability can allow for rapid ingestion, analysis, and processing of vast datasets, thereby accelerating model training, inference, and overall performance of the intelligence server 138 and/or analytics server system 105. The chipsets referenced herein may further incorporate dedicated memory architectures (e.g., High Bandwidth Memory (HBM)) optimized for the data throughput requirements of large intelligence models.

In some embodiments, the intelligence model(s) 140, or components thereof, may be implemented and/or deployed on dedicated hardware accelerators embedded within a system-on-chip (SoC) or as discrete integrated circuits. These hardware implementations can facilitate high-speed data processing and low-latency inference, needed for real-time applications such analyzing captured substantially real-time video stream. Furthermore, the intelligence server 138, or components thereof, including specialized chipsets and intelligence models, may be provided by a third-party vendor or service provider (e.g., via cloud-based AI/ML platforms) or may be developed and maintained in-house.

In some instances, the intelligence server 138, or components thereof, including the specialized chipsets and intelligence models, may be directly integrated into the analytics server system 105 and may be controlled by the data unit 136 comprised in the analytics server system 105. This direct integration can allow for optimized communication pathways, potentially reducing latency and enhancing data privacy by keeping sensitive data within the controlled computing environment of the analytics server system 105.

According to one embodiment, the disclosed network system 100 is optimized to facilitate image data processing and analysis, leveraging a diverse array of cameras such as the one or more cameras 110 to feed the analytics server system 105. According to one embodiment, the one or more cameras 110 are not limited to traditional cameras but encompass a broad spectrum of technologies capable of capturing substantially real-time video stream. This includes, but is not limited to, high-resolution digital cameras, video cameras, thermal imaging sensors, and LiDAR (Light Detection and Ranging) systems. Each sensor type provides a unique data modality, such as visible light imagery, infrared heat signatures, or 3D point cloud data. The system is designed to seamlessly ingest these disparate data streams, whether they are individual snapshots (e.g., static) or continuous video feeds (e.g., dynamic), creating a rich dataset for subsequent analysis. The versatility of the one or more cameras 110 allows the analytics server system 105 to operate effectively across various conditions and environments, from capturing detailed features (e.g., features of data object(s)) in a well-lit space to detecting a heat signature in complete darkness, or generating a precise 3D map of a scene for accurate object tracking.

Once captured by the one or more cameras, the substantially real-time video stream may be transmitted to the analytics server system 105 and/or to the intelligence server 138 for processing. The analytics server system 105, acting as a central hub, can orchestrate the analysis, while the intelligence server, powered by advanced AI and ML computing processes, performs the computationally intensive tasks. For example, the disclosed network system 100 might use a deep learning model of the intelligence server 138 to perform object detection on a video stream, identifying and classifying various data objects in real-time. It could then employ a separate computing process to analyze the movement and behavior of the data objects, recognizing complex interactions or anomalies. In some cases, the intelligence server 138 may combine data from multiple sensors (e.g., cameras 110) and can fuse a thermal image with a visual one to more accurately identify an object or use LiDAR data to provide precise spatial context to a 2D image. This integrated approach allows the network system 100 to extract a more comprehensive and nuanced understanding of the scene than would be possible with a single processing method, enabling a wide range of applications from security and surveillance to autonomous navigation and environmental monitoring.

Furthermore, the one or more cameras may work with, or have integrated within their hardware setup, various illumination systems to optimize data capture, extending the one or more cameras capabilities far beyond standard daylight conditions. These illumination systems, which can be positioned proximally (e.g., a built-in flash on a camera) or distal (e.g., a high-powered floodlight or infrared emitter), work in tandem with the one or more cameras 110 to improve the quality and utility of the captured substantially real-time video stream.

The illumination systems referenced herein can encompass a wide range of technologies, each serving a specific purpose. For visible light imaging, active illumination like high-intensity LEDs or floodlights can be used to brighten a scene, ensuring clear and well-exposed images even in low-light conditions. These systems can be static or dynamic, adjusting their intensity based on the ambient light or focusing on a specific area of interest. For example, a streetlamp-style distal illuminator can provide broad coverage for a public space, while a proximal illuminator on a camera can provide a burst of light for a quick snapshot.

Expanding beyond the visible spectrum, the one or more cameras can have attendant infrared (IR) illumination systems, which are crucial for night vision and covert surveillance. These systems can emit IR light, which is invisible to the human eye but detectable by IR-sensitive cameras. This allows the one or more cameras 110 to capture detailed images in complete darkness without alerting an imaged data object in the substantially real-time video stream to its presence. This is particularly useful for security applications or wildlife monitoring.

Furthermore, the one or more cameras 110 can incorporate other advanced illumination and sensing techniques. Thermal imaging sensors can be used in conjunction with the one or more cameras 110 that highlights heat signatures, allowing for the detection of a data object even through smoke, fog, or camouflage. This is especially useful for search and rescue operations or for identifying a data object in a chaotic environment.

The raw data can comprise a substantially real-time video stream from the one or more cameras 110 may be subjected to a series of data conditioning including sophisticated signal processing and image optimization operations within the analytics server system 105 and/or the intelligence server 138. This step beneficially refines the raw data before it is analyzed.

A relevant process comprised in the data conditioning is noise reduction, which filters out random fluctuations in the raw data caused by low light or high sensor gain. Computing processes such as spatial and temporal filtering can be applied to create a cleaner image with less grain, improving the accuracy of subsequent AI and ML operations. For substantially real-time video stream captured with IR illumination, specialized algorithms can enhance the contrast and detail of heat signatures, making it easier to classify and identify objects.

In addition, the data conditioning phase may employ advanced computational photography techniques. This can include High Dynamic Range (HDR) imaging, where multiple images of a given scene (e.g., a captured view by the one or more cameras 110) are captured at different exposures and then combined to create a single image with detail in both the brightest and darkest areas. Additionally, image stitching can be used to combine multiple images from different cameras comprised in the one or more cameras into a single, comprehensive view of the scene, providing a wider field of view. The intelligence server 138 can also apply real-time image enhancement and sharpening filters to make the raw data more suitable for specific analytical tasks, such as facial recognition or object tracking, ensuring that every piece of data is optimized for its intended purpose.

System Diagram

FIGS. 2 and 3 illustrate exemplary system and functional diagrams of a computing environment 200, within which one or more systems shown in FIG. 1 can be implemented. Specifically, FIG. 2 provides a system diagram of the computing environment, whereas FIG. 3 provides a detailed functional diagram of the computing environment 200.

The computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 115 of FIG. 1. The computing environment 200 may be implemented on general-purpose hardware and/or specifically-purposed hardware as the case may require.

The processing unit 202 may control one or more of the memory unit(s) 204, the I/O unit 206, and the communication unit 208 of the computing environment 200, as well as any included subunits, elements, components, devices, and/or functions performed by the memory unit 204, I/O unit 206, and the communication unit 208. The described subelements of the computing environment 200 may also be included in similar fashion in any of the other units and/or devices included in the network system 100 of FIG. 1. Additionally, any actions described as being performed by a processor may be executed by the processing unit 202 of FIG. 2 alone and/or by the processing unit 202 in conjunction with one or more additional processors, units, subunits, elements, components, devices, and/or the like. For example, the processing unit 202 may be configured to implement computing instructions that process or otherwise analyze received real-time or near real-time image or video data from the one or more cameras discussed above.

Further, while one processing unit 202 may be shown in FIG. 2, multiple processing units may be present and/or otherwise included in the computing environment 200 or elsewhere in the network system 100 of FIG. 1. Thus, while instructions may be described as being executed by the processing unit 202 (and/or various subunits of the processing unit 202), the instructions may be executed simultaneously, serially, and/or otherwise by one or multiple processing units 202 on one or more computing devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, image content, video content, textual content, audio-visual content, or any combination thereof. In some instances, content on which the content management unit 212 may operate includes device information, user interface data, images, text, themes, audio files, video files, documents, and/or the like. Additionally, the content management unit 212 may control (e.g., format) the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data such as pipeline data or analysis data or other output data generated using at least a file and/or the like. In some embodiments, the GPU 216 may be used to render content for presentation on a computing device via, for example, a graphical display device or a graphical user interface (GUI) of a display device of the endpoint device 125*a*. The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operations within the computing environment 200. In one embodiment, the memory unit 204 stores instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself. Moreover, the memory unit may store code for implementing the data unit 136 associated with the analytics server system 105.

Furthermore, the memory unit 204 can also be used to store one or more computing models, relationship record(s) associated with category data determined during, for example, classification computing operations executed on a captured substantially real-time video stream using the one or more cameras. The category data, for example, can be linked to, or characterize features of objects imaged using the one or more cameras.

Turning back to FIGS. 2 and 3, the memory unit 204 may include various types of data storage media such as solid-state storage media, hard disk storage media, virtual storage media, and/or the like. Memory unit 204 may include dedicated hardware elements such as hard drives and/or servers, as well as software elements such as cloud-based storage drives. In some implementations, memory unit 204 may include a random-access memory (RAM) device, a dynamic random-access memory (DRAM) device, a static random-access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described in this disclosure. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 includes one or more databases 210 for storing any data described herein. For example, depending on the implementation, the one or more databases 210 may be used as the local computing database 111*a* or remote computing database 111*b* associated with the analytics server system 105. In some embodiments, the memory unit 204 and/or its subunits may be local relative to the analytics server system 105 and/or be remotely located relative to the analytics server system 105.

The memory unit 204 may include subunits such as an operating system unit 226, an application data unit 228, an application programming interface (API) unit 230, a content storage unit 232, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include the data unit 136 and the intelligence unit 140. The data unit 136 and/or intelligence unit 140 may be configured to implement one or more of the disclosed computing methods or operations. According to one embodiment, the data unit 136 and/or the intelligence unit 140 comprise one or more of a analytic data flux processor (ADFP), a cognitive data orchestration unit (CDOU), an insight generation hypervisor (IGH), a metric derivation computational fabric (MDCF), a phenomenological data synthesizer (PDS), a quantitative intelligence abstraction engine (QIAE), an adaptive data analytics core (ADAC), a contextual insight graph engine (CIGE), an empirical data transformation array (EDTA), or a heuristic data pattern extractor (HDPE).

The operating system unit 226 may facilitate deployment, storage, access, execution, and/or utilization of an operating system used by computing environment 200 and/or any other computing environment described in this disclosure. In some embodiments, operating system unit 226 may include various hardware and/or software elements that serve as a structural platform for the processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, an endpoint device (e.g., endpoint device 125*a*) may be required to download, install, access, and/or otherwise use a software application (e.g., web application) to facilitate performance of one or more of the disclosed computing operations. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described in this disclosure. For example, computing environment 200 may include one or more APIs for various devices, applications, units, subunits, elements, and/or other computing environments to communicate with each other and/or use the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the analytics server system 105 and/or the display device of the endpoint device 125*a* to communicate with each other.

The content storage unit 232 may facilitate deployment, storage, access, and/or utilization of information associated with performance of the disclosed operations by computing environment 200 and/or any other computing environment described. In some embodiments, content storage unit 232 may communicate with content management unit 212 to receive and/or transmit content files (e.g., media content, image data, video data, audio-visual data, visualization data, etc.).

The cache storage unit 240 may facilitate short-term deployment, storage, access, analysis, and/or use of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing processes described herein. For example, elements of the I/O unit 206 may be used to receive input from the analytics server system 105. As described, I/O unit 206 may include subunits such as an I/O device 242, an I/O calibration unit 244, and/or driver 246.

The I/O device 242 may facilitate receipt, transmission, processing, presentation, display, input, and/or output of information as a result of executed processes described in this disclosure.

In some embodiments, the I/O device 242 may include a plurality of I/O devices. In some embodiments, device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally, and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute the disclosed operations.

The I/O calibration unit 244 may facilitate the calibration of the I/O device 242. For example, I/O calibration unit 244 may detect and/or determine one or more settings of I/O device 242 and then adjust and/or modify settings and/or format and/or optimize viewing of a graphical user interface and/or one or more visualizations associated with alerts or alert data communications. According to some embodiments, the I/O calibration unit 244 may be used to format or resolve, for example, data communications such as alerts into multidimensional data components (e.g., multi-modal data including multiple aspects such as image data, video data, textual data, etc.) and rendering the multidimensional data components on a display device.

In some embodiments, the I/O calibration unit 244 may use a driver 246 (or multiple drivers) to calibrate I/O device 242. For example, driver 246 may include software that is installed by I/O calibration unit 244 so that an element of computing environment 200 (or an element of another computing environment) may recognize and/or integrate with I/O device 242 for disclosed processes.

The communication unit 208 may facilitate establishment, maintenance, monitoring, and/or termination of data communications (e.g., control or alert data communications) between computing environment 200 and other computing environments, third party server systems, and/or the like. Communication unit 208 may also facilitate internal communications between various elements (e.g., units and/or subunits) of computing environment 200. For example, the communication unit 208 may be configured to receive a substantially real-time video stream from n-pairs of the one or more cameras 110 as well as coordinate the transmission and/or storage of any attendant data such as analysis reports associated with analyzing the substantially real-time video stream and/or any alerts to stakeholders with the two or more endpoint devices. In some embodiments, communication unit 208 may include a network protocol unit 248, an API gateway 250, an encryption unit 252, and/or a communication device 254. Communication unit 208 may include hardware and/or software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing the disclosed methods and/or data visualization operations and/or other processes provided in this disclosure.

The API gateway 250 may allow other devices and/or computing environments to access API unit 230 of memory unit 204 of computing environment 200. For example, display devices associated with the various systems of FIG. 1 may access API unit 230 of computing environment 200 via API gateway 250. In some embodiments, API gateway 250 may be required to validate user credentials associated with a user of a display device prior to providing access to API unit 230 to a user. API gateway 250 may include instructions for computing environment 200 to communicate with another device and/or between elements of the computing environment 200.

The encryption unit 252 may facilitate translation, encryption, encoding, decryption, and/or decoding of information received, transmitted, and/or stored by the computing environment 200. Using encryption unit 252, each transmission of data may be encrypted, encoded, and/or translated for security reasons, and any received data may be encrypted, encoded, and/or translated prior to its processing and/or storage. In some embodiments, encryption unit 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Figure 4:
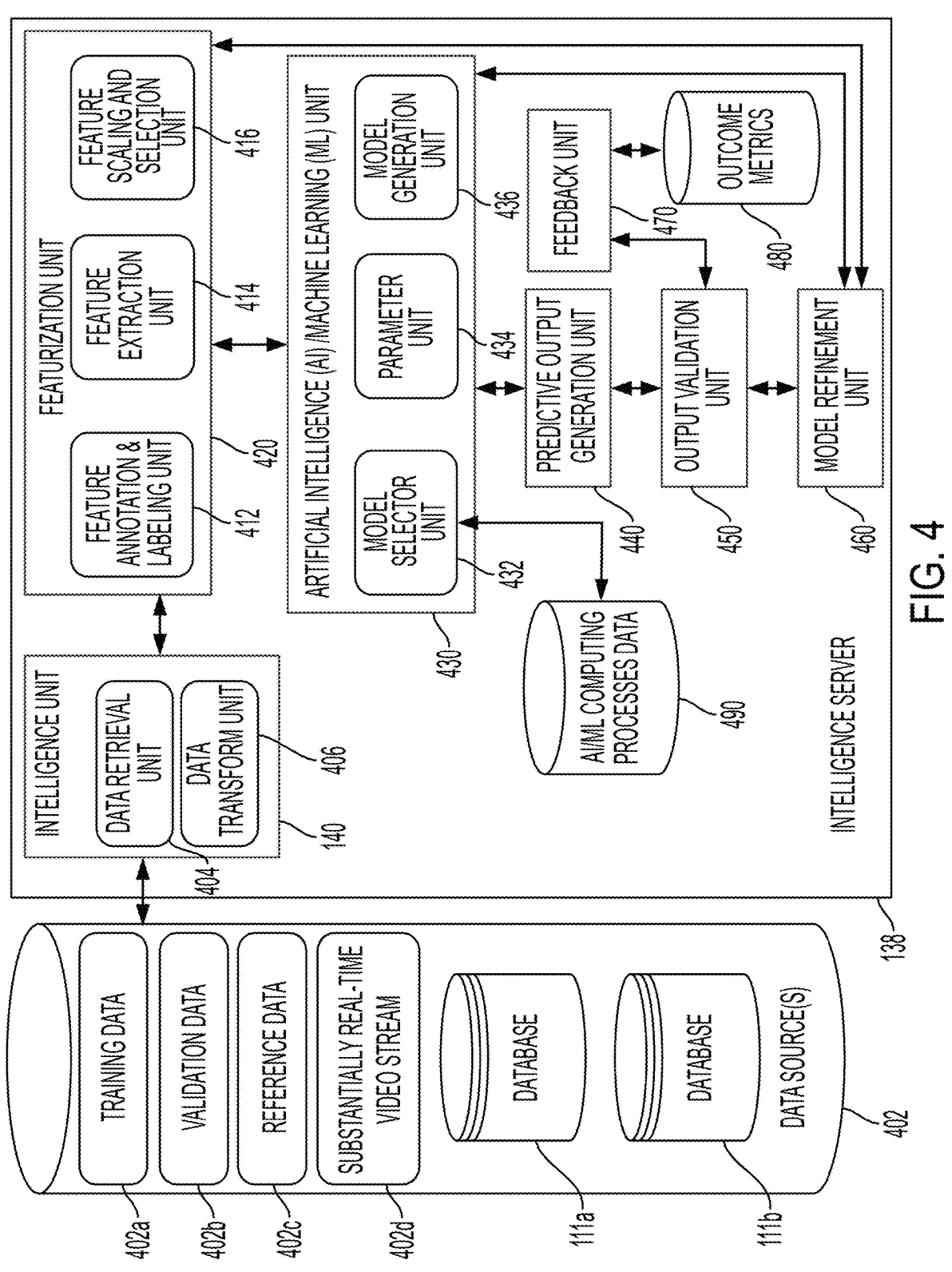
FIG. 4 shows an exemplary communicative coupling of the intelligence server 138 to one or more data sources.

FIG. 4 shows an exemplary communicative coupling of the intelligence server 138 to one or more data sources. In the illustrated implementation, the intelligence server 138 comprises the above-referenced intelligence unit 140 that can include a data retrieval unit 404 and data transform unit 406. Data retrieval unit 404 may be configured to access, assess, interpret, request, or receive data, which may be adjusted, reformatted, or changed. For example, data retrieval unit 404 may request data from a remote source (e.g., data from the one or more cameras 110 and/or databases 111*a* and 111*b* of the analytics server system 105) using an API. Thus, the intelligence unit 140 may be configured to access, interpret, request, format, re-format, or receive input data from the one or more data sources outlined in data source(s) 402. For example, intelligence unit 140 may be configured to use data transform unit 406 to execute a re-configuration or other data changes or data transformations, such as a data dimension reduction prior to the analytics server 105 running intelligence computing operations on said transformed data. Data source(s) 402 may comprise real-time or near real-time captured data that is stored on one or more memories devices such as those discussed in association with FIGS. 2 and 3. In some embodiments, data source(s) 402 may be associated with a single entity (e.g., a single computing network) or with multiple entities (e.g., multiple computing networks). Data source(s) 402 may include one or more of training data 402*a* (e.g., input data to feed a machine learning model as part of one or more training processes), validation data 402*b* (e.g., data against which at least one processor may compare model output with, such as to determine model output quality), reference data 402*c*, and/or a substantially real-time video stream 402*d*. In some embodiments, intelligence unit 140 can be implemented using at least one computing device. For example, data from data sources 402 can be obtained through one or more I/O devices and/or network interfaces. Further, the received data may be stored (e.g., during execution of one or more operations) in a suitable storage or system memory. Intelligence unit 140 may also be configured to interact with a memory unit (e.g., memory unit 204), which may be implemented on a computing device that stores data in a storage device.

In some embodiments, intelligence unit 140 comprises an executable software module containing one or more instructions or computer-executable logic. These instructions are specifically configured to be executed by one or more processors, such as the processors discussed in association with FIGS. 2 and 3, to perform computing operations of the intelligence server 138 including coordinating with the various units of the intelligence server 138 to perform intelligent computing operations such as human-object interaction recognition (HOIR) and/or multi-camera multi-object tracking (MCMOT) computing operation.

In some embodiments, the MCMOT computing operation referenced herein is based on a multi-stage data processing pipeline executed by one or more processors. This data processing pipeline may be configured to receive one or more video data streams from corresponding one o more cameras and process said streams using at least one object detection model associated with the intelligence server 138 to generate bounding box data for a plurality of objects detected within the video data. For each detected object (referred to as data object elsewhere herein), a re-identification model associated with the intelligence system extracts an appearance-based feature vector. Concurrently or separately, a motion model associated with the intelligence server 138 may be used to generate a predicted position for each detected object based on said object's prior trajectory. A data association model associated with the intelligence server may be subsequently used to process the bounding box data, the appearance-based feature vectors, and the predicted positions of the detected object to associate detections of the same object across frames and between different camera views, thereby assigning and maintaining a consistent identifier for each object detected.

In some embodiments, the above referenced HOIR computing operation may be based on a multi-stage analytical framework executed by one or more processors. This framework may be configured to first process image data with at least one object detection model associated with the intelligence server 138, to generate bounding box data for a plurality of data object instances (e.g., interactions between persons or between persons and articles). For each potential data object pair, a feature extraction computing operation may be executed to generate a composite feature set; this feature set may comprise appearance data from the data object instances, skeletal keypoints for a data object instance may be derived from a pose estimation model associated with the intelligence server 138, and spatial data defining the geometric relationship between respective bounding boxes associated with the data object pairs. Subsequently, an interaction classification model associated with the intelligence server 138 may process this composite feature set to generate an output that classifies the semantic interaction in data object pairs, such that the resulting output comprises an interaction triplet identifying a first data object instance, a second data object instance, and a predicted verb that defines the relationship between the first data object and the second data object.

Furthermore, intelligence server 138 may include featurization unit 420. According to one embodiment, featurization unit 420 may include a feature annotating and labeling unit 412 configured to annotate or label features from a model or received data such as a substantially real-time video stream that is extracted by feature extraction unit 414. The featurization unit 420 may also include a feature extraction unit 414 configured to extract and/or classify one or more features from a model or data such as the disclosed substantially real-time video stream. In addition, the featurization unit may also include a feature scaling and selection unit 416 configured to determine, select, limit, constrain, concatenate, or define features (e.g., AI features) for use with AI or ML models. Similar to intelligence unit 140, featurization unit 420 can be implemented on a computing device. In addition, the featurization unit 420 can use storage or system memory for storing data and can use one or more I/O devices or network interfaces for transmitting or receiving data.

The intelligence server 138 may also include machine learning (ML) modeling unit 430, which may be configured to execute one or more modeling computing operations on an AI or ML model (e.g., model training, model re-configuration, model validation, model testing), such as those described in the processes described herein. For example, the ML modeling unit 430 may execute an operation to train an AI or ML model, such as adding, removing, or modifying a model parameter. Training of an AI or ML model may be supervised, semi-supervised, or unsupervised. In some embodiments, training of an AI or ML model may include multiple epochs, or passes of data (e.g., training data 402*a*) through an AI or ML model process (e.g., a training process). In some embodiments, different epochs may have different degrees of supervision (e.g., supervised, semi-supervised, or unsupervised).

Training data for a given AI or ML model under consideration may include input data (e.g., as described above) and/or data previously output from a model (e.g., forming recursive learning feedback). A model parameter may include one or more of a seed value, a model node, a model layer, a computing process, a function, a model connection (e.g., between other model parameters or between models), a model constraint, or any other digital component influencing the output of a model. A model connection may include or represent a relationship between model parameters and/or disparate models, which may be dependent or interdependent, hierarchical, and/or static or dynamic. The combination and configuration of the model parameters and relationships between model parameters discussed herein can be cognitively infeasible for the human mind to maintain or use. Without limiting the disclosed embodiments in any way, an ML or AI model may include millions, trillions, or even billions of model parameters.

ML modeling unit 430 may include model selector unit 432 (e.g., configured to select a model from among a plurality of models, such as based on input data), parameter selector unit 434 (e.g., configured to add, remove, and/or change one or more parameters of a model), and/or model generation unit 436 (e.g., configured to generate one or more machine learning models, such as according to model input data, model output data, comparison data, and/or validation data). In some embodiments, model selector unit 432 may be configured to receive input and/or transmit output to AI/ML computing processes database 490. AI/MVL computing processes database 490 may store one or more AI/ML models, any of which may be fully trained, partially trained, or untrained. A machine learning model may be or include, without limitation, one or more of (e.g., such as in the case of a metamodel) a statistical model, a complex computing process, a neural network (NN), a convolutional neural network (CNN), a generative neural network (GNN), a Word2Vec model, a bag of words model, a term frequency-inverse document frequency model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein.

Intelligence server 138 can further include predictive output generation unit 440, output validation unit 450 (e.g., configured to apply validation data to machine learning model output), feedback unit 470 (e.g., configured to apply feedback to a model), and model refinement unit 460 (e.g., configured to update or re-configure a model). In some embodiments, feedback unit 470 may receive input and/or transmit output (e.g., output from a trained, partially trained, or untrained model) to outcome metrics database 480. Outcome metrics database 480 may be configured to store output from one or more models and may also be configured to associate output with one or more models. In some embodiments, outcome metrics database 480, or other device (e.g., model refinement unit 460 or feedback unit 470) may be configured to correlate output, detect trends in output data, and/or infer a change to input or model parameters to cause a particular model output or type of model output. In some embodiments, model refinement unit 460 may receive output from predictive output generation unit 440 or output validation unit 450. In some embodiments, model refinement unit 460 may transmit the received output to featurization unit 420 or ML modeling unit 430 in one or more iterative cycles.

Any or each unit of intelligence server 138 may comprise a computing unit or a data unit, which may be a packaged functional hardware unit designed for use with other components or a part of a program that implements specific computing operations. Any or each computing unit may be implemented using a computing environment such as those discussed in conjunction with FIGS. 2 and 3. In some embodiments, the functionality of intelligence server 138 may be split across multiple computing environments to allow for distributed processing of the data, which may improve output speed and reduce computational load on individual computing environments. In some embodiments, intelligence server 138 may use load-balancing to maintain stable resource loads (e.g., processing load, memory load, or bandwidth load) across multiple computing environments and to reduce the risk of a computing environment from becoming overloaded. In these or other embodiments, the different components may communicate over one or more I/O devices and/or network interfaces.

It is appreciated that the intelligence server 138 can beneficially facilitate implementing one or more computing operations associated with the network system 100 of FIG. 1. For example, the intelligence server 138 can enable implementing a multi-camera multi-object tracking (MCMOT) computing operations on a captured substantially real-time video stream from the cameras 110. In effect, the intelligence server 138 provides the computational backbone for complex, single, or multi-stage intelligence computing processes. It is appreciated that the intelligence server 138 can ingest a substantially real-time video stream from multiple cameras which can be used in an object detection, and/or establishing data indicative of proximity and contact dynamics assessment between two data objects, where an AI model of the intelligence server 138, identifies and draws a bounding box around each data object comprised in the captured substantially real-time video stream. Following detection, the intelligence server 138 may perform various computing operations such as multi-object tracking (MOT) to assign and/or classify consistent identifiers to each identified object in the substantially real-time video stream across successive image frames within a single view of one or more of the cameras 110. This addresses challenges like temporary occlusion, where an object is briefly hidden from view. Additional complex computing operations implemented using the intelligence server 138 include an MCMOT operation to match and/or maintain a unique identifier for an object as the object moves between different camera frames. This process requires robust AA/ML models to compare and/or match visual features from a first camera view to another, even with changes in lighting, perspective, and posture. The intelligence server 138's processing power and architecture enables these computationally intensive tasks to happen quickly and accurately, allowing for the classification and identification of objects across an entire surveillance area.

According to some embodiments, the intelligence server 138 is configured to perform human-object interaction recognition (HOIR) by analyzing data relationships between a data object and its environment and thereby determine how the data object interacts with other objects comprised in a substantially real-time video stream. The intelligence server 138 can ingest a continuous stream of data (e.g., substantially real-time video stream from one or more cameras), such as images or videos, and applies its AI and ML capabilities to first identify and classify both the data object and other objects in the substantially real-time video stream. This initial step can involve object detection, where the AI or ML models of the intelligence server 138 recognize and label data components (e.g., data object(s)) comprised in the substantially real-time video stream.

In some embodiments, the intelligence server 138 can analyze the spatial and temporal (e.g., spatiotemporal) relationships between an identified data object and other objects comprised in the data components of the substantially real-time video stream. This can involve a deeper layer of AI and/or ML computing operations to infer the nature of the interaction. For example, if the intelligence server 138 detects a data object near an object like a "door," "a car," "a house," "a tree," etc., it might use a trained model of the intelligence server 138 to recognize an action of a given data object such as "opening the door," "entering the car," "leaving a house," "climbing the tree," etc. Thus, the intelligence server 138's output is not just a list of objects but a substantially complete semantic description of an interaction between a given data object and other data objects (e.g., data objects comprising pixel representations of organic or inorganic objects in the real world). This allows the intelligence server 138 to recognize and classify a wide range of actions, providing a nuanced understanding of a camera scene comprised in a substantially real-time video stream by identifying not just what is present in the scene, but also what is happening within the scene. It is appreciated that a first data object, a second data object, a third data object, etc., comprised in the substantially real-time video stream may be classified into first category data, second category data, third category data, etc., by the intelligence server 138. The various category data (e.g., first, second, third, etc.) can be associated with groupings such as entity-type groupings for classifying features indicative of primary structural descriptors (e.g., features of an adult or a guardian) based on attributes like dimensional metrics, positional vectors, and morphological signatures; subordinate entity groupings (e.g., groupings based on features of a child or dependent) for transient or auxiliary configurations identified by reduced scale factors, supplementary apparatus integrations, or attenuated trajectory profiles; article groupings for inanimate objects or personal items detected through shape, texture, and contextual placement, such as bags, tools, or clothing; pet groupings for domestic animals recognized by fur patterns, size, and quadrupedal locomotion, encompassing dogs, cats, or birds; furniture groupings for stationary household fixtures such as chairs or tables, differentiated by angular forms and immobility; electronic device groupings for gadgets including phones or appliances, identified by screens, cords, or electronic signatures; plant groupings for vegetation elements like houseplants, based on green hues and organic shapes; wildlife groupings for non-domestic fauna such as rodents or insects, distinguished by erratic behaviors; environmental hazard groupings for potential risks like fire or leaks, detected through rapid changes or irregular patterns; and aggregation or interaction dynamics groupings for clustered configurations of entities, evaluated by proximity and motion vectors. These groupings enable the intelligence server 138 to facilitate enhanced real-time analysis, threat detection, and automated alert generation within the disclosed video stream processing framework.

EMBODIMENTS

Disclosed are methods and systems that are configured for proximity and contact dynamics assessment. According to one embodiment, the disclosed methods and systems include analyzing a substantially real-time video stream to determine or confirm data relationships between two or more data objects comprised therein. For example, the data relationships may indicate a type of interaction between the two or more data objects and/or a duration of interaction between the two or more data objects over a temporal window (e.g., for a given duration of time).

In one embodiment, the data relationships may be used to generate relationship data. The relationship data may inform on whether:

A first data object is related to a second data object. The exemplary criteria for this can be multi-faceted:

Spatial Proximity: The first and second data objects are within a defined distance of each other. This distance can be a static metric, such as 3 feet, or a dynamic one based on their velocity, size, or surrounding environment. For example, two objects in a small room might be considered "related" at a shorter distance than two objects in an open field.

Temporal Proximity: The first and second data objects are present in the same frame or within a specific time window, like 5 seconds of each other.

Shared Action or Event: Both data objects are involved in the same human-object interaction recognition (HOIR) event, such as a "data object" picking up a "tool."

Trajectory Correlation: The first and second data objects are moving along parallel or convergent paths at similar velocities.

Associated Attributes: The two data objects share common attributes like color, size, or type, or they are a part of a specific grouping or configuration, such as a "data object" pushing a "stroller."

The first data object is unrelated to the second data object. The criteria for this can often comprise the inverse of the related criteria, but they can be more specific.

Exceeding Distance Threshold: The first and second data objects are outside a predetermined relationship distance.

Divergent Trajectories: The first and second data objects are moving in opposite directions or on completely different paths.

Temporal Disconnect: The first and second data objects are not present within a common timeframe or are not part of the same event.

Conflicting Attributes: The first and second data objects have attributes that are specific or distinct to be mutually exclusive for a given relationship. For example, a "data object" is a specific member of one group or data category, while another is a member of a different, unrelated group or category.

Behavioral Mismatch: The first and second data objects' behaviors do not align with any specific relational patterns. For instance, one data object is stationary while the other is moving rapidly, indicating no shared purpose or interaction.

The second data object is unaccounted for based on one or more data objects, including the first data object, in occupying a space about the second data object but which do not meet a relationship criteria of a space occupied by the first data object, the second data object, or other data objects within said occupied space. This is the most complex criterion, requiring a robust understanding of the environment and the disclosed system's memory. In particular, this criterion highlights anomalies where an object is present but does not fit into a specific relational context.

Lack of Spatial or Temporal Correlation: The second data object is located in an area with other data objects, but its proximity to them is inconsistent with established relationship criteria (e.g., the first data object is in a crowd but not moving with the flow of the crowd).

Absence of Shared Event: The second data object is in the vicinity of an ongoing event but is not participating in it in any recognizable way, nor is it related to any of the objects involved.

Unusual Trajectory: The second data object's movement within the space is erratic or defies the typical trajectories of other objects in that same space. This could signal a malfunction or a deliberate attempt to evade detection.

Attribute Mismatch: The second data object has attributes that are completely foreign to the other objects in the occupied space (e.g., an object moving at a speed that is outside the specific range for other objects in a given area).

Violation of Environmental Rules: The second data object violates a predefined rule for the occupied space. For example, a large object is detected in an area designated for small objects, and its presence cannot be explained by any relationship with the other objects in that space.

It is appreciated that the above criteria for determining data object relationships are not simple human observations but are instead stored as complex rules and instructions within the intelligence server 138. These rules constitute a sophisticated set of complex computing operations that are impossible for a person to perform with the necessary speed, accuracy, and scale. For instance, the disclosed system analyzes hundreds or thousands of data points simultaneously—including object velocities, trajectories, and a multitude of shared attributes—to generate relationship data in real-time. A person having ordinary skill in the art could not simultaneously process the shared event criteria for multiple objects across a dozen different substantially real-time video stream feeds, much less in real-time or near real-time (e.g., at most 1 second, at most 2 seconds, at most 3 seconds, at most 4 seconds, etc.). In particular, the disclosed system's ability to evaluate intricate spatial and temporal correlations, detect anomalies that violate environmental rules, and classify complex interactions is a feat of computational power and computing design that distinguishes it from manual observation.

In one embodiment, the disclosed system can update one or more data identifiers or data flags or status identifiers associated with one or more data profiles corresponding to data objects with specific data relationships. These updates can be effected within the computing databases 111*a* and/ 111*b* which have the status identifiers (e.g., also simply called status elsewhere herein) or flag. In addition, the updates referenced herein can comprise transitioning a data element of the status identifiers from a first data state to a second data state.

The status identifiers or flags, for example, can comprise a flag that shows a positive relationship between data objects, in which case no further action is take, a flag that there is no relationship between two or more data objects and which can trigger an alert for transmission to one or more endpoint devices 125*a*, . . . , 125*n*. The alert may comprise multidimensional data or multi-modal data (e.g., image data, video data, textual data, etc.) that is displayed on a display device associated with the one or more endpoint devices 125*a*, . . . , 125*n*. In particular, the disclosed analytics server system 105 can use alerts generated from its analysis of data object relationships to trigger a variety of actions, serving multiple purposes beyond simple notifications. In particular, the alert, comprising multidimensional or multi-modal data that provides a detailed, contextual understanding of a situation. The analytics server system 105 can send this alert to an endpoint device, like a display in a security control room or a mobile device, to enhance situational awareness. For example, if the system detects an "unrelated" data object in a high-security area, the alert could include the data object's last known trajectory within a temporal window (e.g., temporal data), a thermal image to show the data object's heat signature (e.g., thermal data), and a 3D point cloud of the data object's location (e.g., spatial data). This comprehensive data informs security operations and response and/or locating and recovering and/or connecting data objects that may be missing or absent based on the status identifiers in the computing databases of the disclosed system. In addition to driving search and rescue operations, the disclosed system can use the alert to guide these efforts with precision. For example, if a data object is unaccounted for in a complex or dangerous environment, the alert could provide a real-time tracking map showing the data object's last known location and direction of travel, as well as a predictive model of its most probable path. The alert can also trigger a chain of events, such as automatically deploying a drone to the last known location or activating additional remote sensors to broaden the search area. The disclosed system's ability to correlate diverse data-such as visible light video with GPS coordinates, biometric data, and environmental sensor readings-allows it to not only signal an anomaly but to provide the tools necessary to resolve said anomaly effectively. For instance, the disclosed system might correlate a "no relationship" flag between a data object and its expected group with an environmental sensor reading of a gas leak, which then triggers an alert for an immediate medical response. The alert becomes a catalyst for an informed, multi-pronged response.

According to one embodiment, the alert can comprise:

Image Data: This can be a high-resolution still image or a series of images capturing a data object and its surroundings. It might also include images from different cameras, such as an infrared image layered over a visible-light image to provide both a clear visual and a thermal signature.

Video Data: This provides a dynamic, real-time or near real-time view of a situation, showing the data object's movement and interactions. It can be a clipped video showing an event as it happened, or a live feed for continuous monitoring.

Textual Data: This adds a layer of semantic and descriptive information. It could be an automatically generated summary of the event (e.g., "unrelated data object entering a restricted area"), the data object's identified attributes, or a record of its previous behaviors. This data is crucial for providing context that images and video alone cannot convey.

Time Identifiers: These are precise timestamps that log a sequence of events associated with the data object. They can establish a timeline, track the duration of an anomaly, and correlate events across different data streams.

Spatial Data: This provides precise location information of the data object. It can be GPS coordinates, a 3D point cloud from a LiDAR sensor, or a map overlay showing the data object's exact position within a given space, etc. This is vital for guiding physical responses.

Biometric Data: In relevant contexts, this could include a person's biometric information, such as facial features, gait analysis, or other biosignatures, that has been captured by a sensor.

Audio Data: The alert could also contain audio from the environment, such as a sharp noise or a specific vocal cue, which provides additional information about the event.

Environmental Data: This includes data from other sensors in the area, such as temperature, air quality, or humidity. This data can be correlated to events, for example, a rise in temperature might be linked to a fire, which the disclosed system can then identify as a reason for an "unaccounted for" data object.

In one embodiment, the n-pairs of cameras 110 are either overlapped or non-overlapped. Each pair of cameras 110 are configured to provide a or near real-time image or video streams. Further, the real-time mage or video streams of the n-pairs of cameras 110 can be synchronized and/or calibrated to a common coordinate system defined by a plane, that is serving as a reference for an entire monitoring area comprising one or more data objects, to track the one or more objects while moving across the different regions. Furthermore, the calibration information may be provided as an input to the analytics server system 105, thereby allowing for accurate projection of multi-dimensional (e.g., 2D or 3D) pixel coordinates from the real-time or near real-time image or video stream frames onto the plane. In addition, each pair of the cameras 110 may be synchronized and live-streamed to ensure temporal consistency in the real-time or near real-time image and video stream, thereby capturing the same moment in time from multiple perspectives.

In one embodiment, the analytics server system 105 uses a multi-camera multi-object tracking (MCMOT) computing operation to analyze an environment comprised in one or more captured substantially real-time video streams. This computing operation may be configured to identify each distinct data object within a scene of the environment and, for each data object, assigns it a unique identifier, an object type (e.g., person, an article, a pet, or a static structure), a bounding box that outlines its shape, and a set of coordinates that pinpoint the location of each data object in the plane. Essentially, the MCMOT computing operation acts as a foundational layer, providing a continuously updated list of all objects and their basic properties within the plane.

The HOIR computing operation then leverages this detailed information from the MCMOT output to determine which data objects are interacting with each other. The HOIR computing operation does this by using the bounding boxes and object types, along with a metric (e.g., intersection over union (IoU) metric which measures the degree of overlap between two bounding boxes. A high IoU value for two data objects indicates the data objects are in very close proximity or are overlapping, which is an indicator for a potential interaction. This allows the disclosed system to differentiate between objects that are simply near each other and those that are actively engaging.

The HOIR computing operation can recognize two or more types of interactions including: physical interactions, where contact dynamics are present and the data objects are physically touching (e.g., a data object grasping a tool), and nonphysical interactions, where there is no physical contact but a clear relationship exists (e.g., a data object holding the hands of another data object, a data object riding a bicycle, and a data object carrying another data object,). The disclosed system can appreciate that the disclosed data objects are computational models representing real-world items like a person, a pet, an article, or a building, etc., allowing it to translate complex digital relationships back into a meaningful understanding of a real-world scene.

The analytics server system 105, according to one embodiment, is configured to communicate with and store information in computing databases 111*a* and 111*b*, acting as a centralized computing database for the disclosed system's analytical output. The data stored within these computing databases provides a comprehensive record of the disclosed system's observations and analyses. This can include detailed interaction data between two or more data objects, identifier data for unique object recognition, and tracking data that logs an object's movement overtime. The computing databases can also contain object type data, which classifies objects as either organic (e.g., a person) or inorganic (e.g., an article such as a bicycle), and various status or flags data that indicate the state of a data object at a given time.

The interaction data may be rich, as it is based on object detections that incorporate an interaction class (or type), which describes the nature of the interaction between two data objects. For example, an interaction class or type might be physical contact between a first data object and a second data object, or between the first data object and an article associated with the second data object. Such scenarios can include: a first data object holding the hands of a second data object (e.g., an adult holding a child hands); a data object interacting with an article (e.g., a data object riding a bicycle, or a first data object carrying another data object an adult carrying a child); a first data object pushing an article within which is the second data object (e.g., an adult pushing a stroller within which is a child); etc.

According to one embodiment, the disclosed system is configured to manage and track interactions between a first data object and a second data object within an environment, using, for example, a video stream (e.g., video stream data) to derive status information about at least the second data object as well as relationship data (e.g., relationship attributes) between the first data object and the second data object. It is appreciated that the first data object can represent a primary entity (e.g., an adult), while the second data object represents a secondary entity (e.g., a child/dependent) associated with, or not associated with the first data object in a specific context.

According to one embodiment, the second data object is assigned a status (e.g., a status attribute) that reflects its current state within a database system associated with the system. It is appreciated that the disclosed system can assign the following statuses to the second data object: "attended," "unattended/lost," "kidnapped/suspicious," or "not initialized." The "attended" status may be assigned to a second data object when a substantially real-time video stream visually confirms that the second data object is in close proximity or actively interacting with the first data object, indicating a deliberate relationship. For example, the disclosed system may detect consistent spatial proximity (e.g., within a defined distance threshold), synchronized movement trajectories, or physical interactions, such as the first data object guiding or staying near the second data object. These visual indicators can be processed using object detection and tracking techniques (e.g., MCMOT and HOIR computing operations) to validate the "attended" status, ensuring the second data object is under active supervision within the monitored environment.

According to one embodiment, a second data object is designated an "unattended/lost" status when the second data object (e.g., a dependent) is identified as not being in a confirmed relationship with a first data object (e.g., a guardian) for longer than a duration threshold, and a computed distance on the world plane between the second data object and the first data object exceeds a distance threshold (e.g., at least 2 feet or at least 4 feet or at least 5 feet, or at least 6 feet, etc.). In particular, the "unattended/lost" status may be assigned to the second data object in case of an absence of a confirmed relationship between the first data object and the second data object for more than a duration threshold. The duration threshold, for example, can comprise one of at least 2 minutes or at least 3 minutes or at least 4 minutes, or at least 5 minutes. This can be based on one or more of: the second data object being separated from the first data object, such that the first data object has a confirmed relationship with the second data object, wherein the confirmed relationship is based on the first data object being in a relationship record or a guardian list associated with the second data object; and when there is no established relationship between the second data object and the first data object, suggesting that the second data object has a "not initialized" status.

The "kidnapped" or suspicious status may be assigned to the second data object when the second data object has an "unattended/lost" status and establishes a new confirmed relationship with the first data object that is not a recognized guardian of the second data object.

The "not initialized" status may be applied to a second data object when it is determined that a second data object has no confirmed relationships with a first data object or when the second data object has not established any confirmed relationships with the first data object.

In some embodiment, if the second data object has an "unattended/lost" status establishes a new confirmed relationship with a first data object (e.g., adult) whose identifier (e.g., global identifier) is not listed in the second data object's (e.g., dependent's) relationship record or guardians list, said second data object's status may be updated to "kidnapped/suspicious." Further, if first identifier data (e.g., a global identifier) of the first data object (e.g., an adult) matches any second identifier data (e.g., global identifiers) listed in the second data object's relationship record or guardians list, the status of the second data object can be restored to "attended."

In some embodiments, a change in status for the second data object comprises: identifying status data associated with the second data object within a database; and transitioning said status data from a first data state to a second data state. The first or second data states can have data identifiers or data values that comprise "attended," "unattended or lost," "kidnapped or suspicious," and "not initialized."

According to one embodiment, the relationship between the first data object and the second data object may be classified as either "confirmed" or "not confirmed," based on video stream analysis. This classification may be determined by analyzing visual data to identify patterns of interaction between the two data objects. In some cases, the "confirmed" or "not confirmed" relationship status may also be determined based on a relationship record that includes identifiers first data objects (e.g., including the first data object) associated with the second data object. A "confirmed" relationship may be established when the relationship record indicates a pre-existing association, such as a stored linkage between the first and second data objects, corroborated by consistent visual data demonstrating coordinated interactions, such as sustained proximity (e.g., within a few meters), aligned motion paths, or specific behavioral cues like directional gestures, processed through pattern recognition and machine learning models. For example, the system might confirm a relationship if the first and second data objects are listed as associated in the relationship record and are observed moving together consistently across multiple frames in the video stream. Conversely, a "not confirmed" relationship may be assigned when the relationship record lacks an association or when video analysis fails to detect coordinated patterns, indicating no verifiable connection between the data objects. In some cases, the disclosed system's ability to designate the second data object as, for example, "unattended," remains independent of determining whether the relational status (e.g., the relationship status of "confirmed" or "not confirmed") between the first data object and the second data object, allowing status updates based on visual evidence of supervision or lack thereof. By integrating real-time video processing, object tracking, and behavioral analysis, the disclosed system ensures precise and timely updates to both the status attributes (e.g., attended, unattended, lost, kidnapped, or not initialized) of the second data object and relationship attributes (e.g., "confirmed" or "not confirmed") between the first data object and the second data object), enabling effective monitoring and response capabilities of the disclosed system.

In another embodiment, if a status of a data object is designated as "lost"—a state corresponding to no confirmed relationship or the absence of data records establishing a data relationship between the first data object and the second data object for a duration exceeding a threshold—the analytics server system 105 may check for a newly established confirmed relationship between the first data object and the second data object. If the data records have a global identifier indicating the relationship between the first data object and the second data object, the status indicating this relationship may be updated to "attended." The analytics server system 105 can also update the statuses associated with the second data object to reflect a "suspicious" data status or flag if a new confirmed relationship is established with a third data object whose global identifier is not found in the data records. This ensures that all data objects are properly classified based on their object type, allowing differentiation between the first data object and the second object and the third data object. Interactions between these data objects can be considered, and they can include a range of behaviors showing care, responsibility, and control, such as one data object guiding another, carrying an associated object, or engaging in coordinated activities. The analytics server system 105 can update the statuses associated with multiple data records based on the aforementioned relationships or criteria and global identifier updates in the records within the computing databases 111*a* and/or 111*b*. The status of the second data object may be designated as "lost" if its record does not show a link between the first data object and the second data object.

It is appreciated that a global status identifier may be activated for one or more data objects. The global status identifier may include a status data element that can be transitioned from first data state to a second data state and thereby indicates a relationship between a first data object and a second data object. Updates to the global status identifier may be based on link record that connect the second data object, for example, to one or more data objects including the first data object. The link record, for example, can comprise an updatable data record that serves as basis for comparing interaction data between the second data object and multiple data objects including the first data object to determine a relationship between the second data object and the multiple data objects.

It is further appreciated that the analytics server system 105 may be configured to track the various state transitions of various flags or statuses associated with one or more relationship records of multiple data objects. In one embodiment, the analytics server system 105 is configured to extract recovery information using a relationship record associated with a "lost" data status and/or a "kidnapped" status of, for example, a second data object to restore a first data object's link to the second data object. This can be based on feature data extracted from the first data object and the second data object which have been analyzed to generate confirmation data affirming the relationship between the first data object and the second data object. The feature data can include physical characteristics associated with the first and/or second data objects, location information of where the first or second data objects are located, proximity data between the first data object and the second data object, etc.

The present disclosure offers significant advantages based on the use of various complex systems that are able to analyze and/or synthesize a substantially real-time video stream to make determinations associated with proximity and/or contact dynamics between two or more data objects. In particular, the disclosed system can continuously track and identify multiple data objects across different camera views, assigning them unique identifiers. This provides a persistent and reliable understanding of object location and movement, which is crucial for contextual analysis. Furthermore, the disclosed system leverages this persistent tracking of data to analyze interactions between two or more data objects. Instead of just identifying objects in a single frame, the disclosed system establishes data trajectories associated with how a first data object spatiotemporally interacts with a second data object and determines if the first and second data object are merely co-located or if they are truly interacting.

Furthermore, the disclosed system offers a significant advantage in its ability to differentiate between simple proximity and meaningful contact dynamics. Specifically, the disclosed system can analyze a history and future trajectory of data objects based on a captured substantially real-time video stream from one or more cameras. This allows for the disclosed operations to go beyond a basic spatial check (e.g., "are two objects close?") to evaluate an "intent" and nature of their interaction. For instance, two data objects passing each other in space-time might have a brief high IoU data, but the disclosed system, informed by their respective trajectories, can correctly classify this as a non-interacting event. Conversely, if two data objects maintain a consistent close proximity, or if their movements are correlated over time, the disclosed system can flag this as a potential interaction, even without a direct physical contact. The analysis of contact dynamics is further enhanced by the disclosed system's ability to recognize physical contact from a mere spatial overlap, which is critical for applications such as detecting a "data object" picking up or putting down a package, or in safety scenarios where an unauthorized physical contact needs to be flagged. This deep level of analysis provides a more nuanced understanding of events, reducing false positives and enabling more accurate, context-aware alerts.

Exemplary Workflow

Figure 5B:
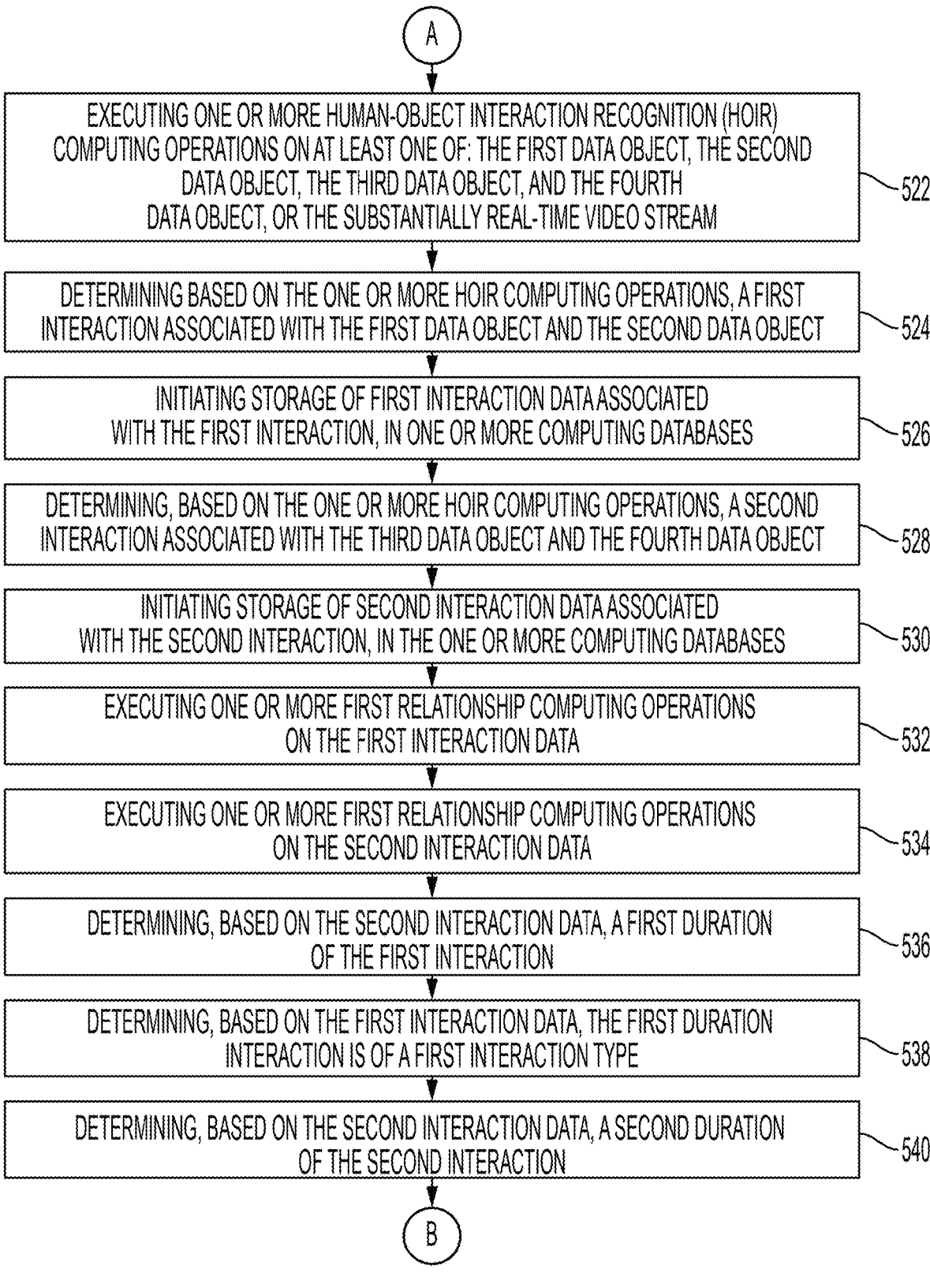
Figure 5C:
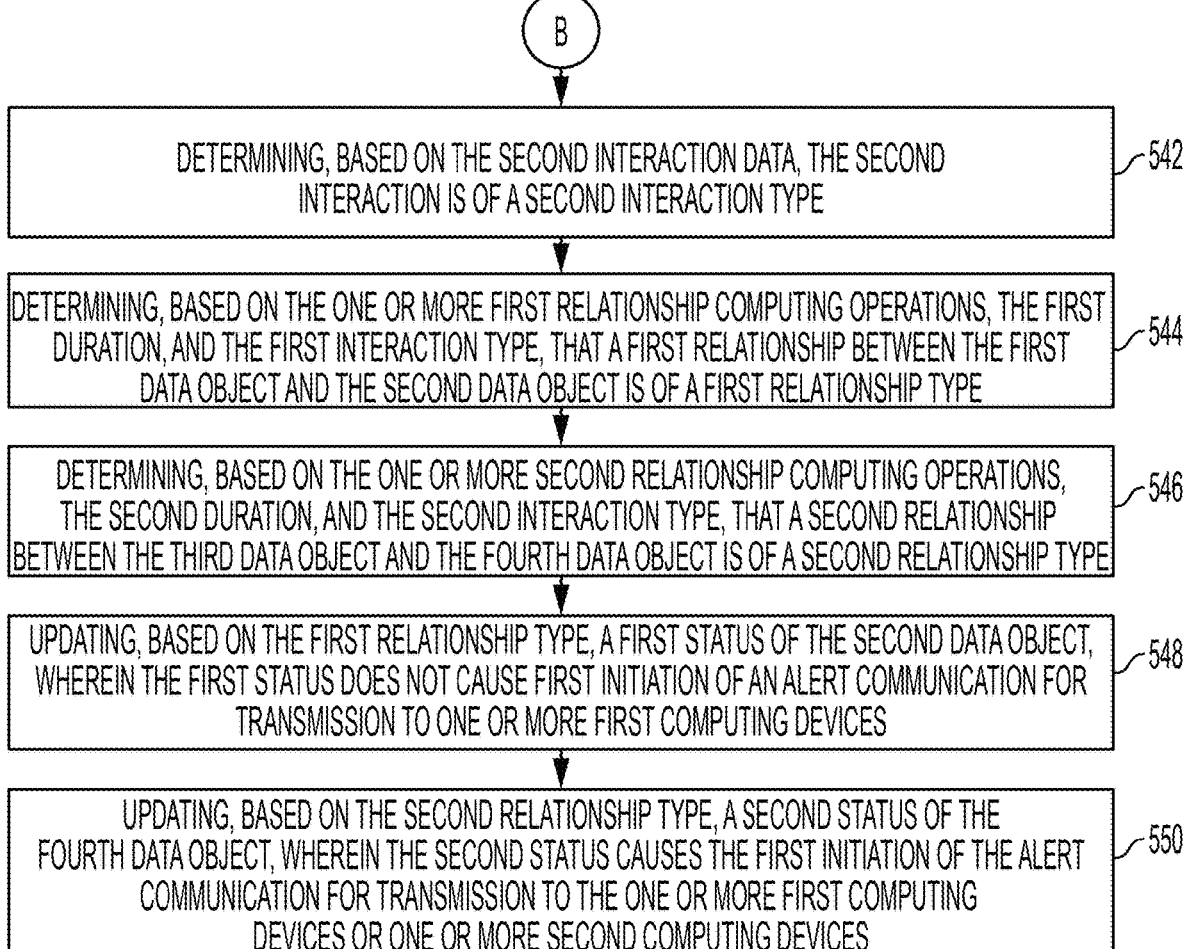

FIGS. 5A-5C show exemplary workflows associated with tracking data objects, determining status of the data objects, and responsively controlling alert communications. One or more data units, comprising control logic or applications stored in a non-transitory memory device, can enable the implementation of various stages within these workflows. The one or more data units can operate independently or in conjunction with a data communication software tool for transmitting and/or receiving real-time or substantially real-time or near real-time video streams. Furthermore, the one or more data units may comprise one or more of the above-referenced data unit 136 and/or intelligence unit 140. In one embodiment, the real-time or substantially real-time or near real-time video streams can comprise static or dynamic video data that is processed or otherwise analyzed to direct, control, or regulate the transmission of one or more data alerts to a first set of computing devices and/or a second set of computing devices, as the case may require.

At block 502, the one or more data units may receive a substantially real-time video stream captured by a first camera in a first area or a second camera in the first area or a second area. In one embodiment, the first camera or the second camera comprise at least one imaging sensor that is configured to capture static or dynamic video data. The first or second area could comprise a real-world space which can be gridded or non-gridded, and which falls in the field of view of the first camera or the second camera.

At block 504, the one or more data units may execute one or more multi-camera multi-object tracking (MCMOT) computing operations on the substantially real-time video stream. Following this, the one or more data units may facilitate identifying and tracking, at block 506, based on the one or more MCMOT computing operations, a first data object in the substantially real-time video stream. Similarly, the one or more data units may also facilitate: identifying and tracking, at block 508, based on the one or more MCMOT computing operations, a second data object in the substantially real-time video stream; identifying and tracking, at block 510, based on the one or more MCMOT computing operations, a third data object in the substantially real-time video stream; identifying and tracking, at block 512, based on the one or more MCMOT computing operations, a fourth data object in the substantially real-time video stream. According to one embodiment, one or more of the first data object, the second data object, the third data object, and the fourth data object comprise complex digital representations or complex models of one or more organic or inorganic entities. Furthermore, the substantially real-time video stream can be configured or otherwise formatted into a feature vector prior in order for the one or more MCMOT computing operations to operate on the feature vector and thereby generate the first data object, the second data object, the third data object, and the fourth data object.

At block 514, the one or more data units determine, based on the one or more MCMOT computing operations, that the first data object is of a first data object type. Similarly, the one or more data units can also determine, at block 516, based on the one or more MCMOT computing operations, that the second data object is of a second data object type. At block 518, the one or more data objects can determine, based on the one or more MCMOT computing operations, that the third data object is of the first data object type. At block 520, the one or more data units can determine, based on the one or more MCMOT computing operations, that the fourth data object is of the second data object type. Thus, the one or more MCMOT computing operations advantageously enable classifying the first and third data objects into first category data (e.g., first data object type) and similarly, the second and fourth data object into second category data (e.g., second data object type). As used herein, the data object type can indicate which category the first, second, third, and fourth data objects belong to. This can include an organic data object category that is associated with persons and/or animals such as pets. In some cases, the category can include an inorganic data category such as homes, trees, trolleys, or other inanimate objects.

In some embodiments, the one or more MCMOT computing operations advantageously enable determining spatiotemporal data indicating location information associated with the first category data relative to the second category data for a temporal window. In addition, the MCMOT computing operations can also facilitate tracking data indicating a proximal relationship between the first category data and the second category data.

At block 522, the one or more data units execute one or more human-object interaction recognition (HOIR) computing operations on at least one of: the first data object, the second data object, the third data object, and the fourth data object, or the substantially real-time video stream.

Turning to block 524, the one or more data units determine, based on the one or more HOIR computing operations, a first interaction associated with the first data object and the second data object. In addition, the one or more data units can initiate storage of, at block 526, first interaction data associated with the first interaction, in one or more computing databases.

At block 528, the one or more data units can determine, based on the one or more HOIR computing operations, a second interaction associated with the third data object and the fourth data object. At block 530, the one or more data units can initiate storage of, second interaction data associated with the second interaction, in the one or more computing databases.

At block 532, the one or more data units can execute one or more first relationship computing operations on the first interaction data. The one or more data units can also execute one or more second relationship computing operations on the second interaction data as shown at block 534.

Turning to block 536, the one or more data units can determine, based on the first interaction data, a first duration of the first interaction. Moreover, the one or more data units can also determine, based on the first interaction data, the first interaction is of a first interaction type as indicated at block 538. At block 540, the one or more data units can determine, based on the second interaction data, a second duration of the second interaction. The one or more data units may also determine, based on the second interaction data, the second interaction is of a second interaction type as indicated at block 542.

At block 544, the one or more data units may determine, based on the one or more first relationship computing operations, the first duration, and the first interaction type, that a first relationship between the first data object and the second data object is of a first relationship type. In addition, the one or more data units may determine, at block 546, based on the one or more second relationship computing operations, the second duration, and the second interaction type, that a second relationship between the third data object and the fourth data object is of a second relationship type. In one embodiment, the one or more first relationship computing operations or the one or more second relationship computing operations comprise computing operations that are implemented to determine a data relationship or a data state dependency between the first and second data objects or between the third and fourth data objects. Furthermore, the one or more first relationship computing operations or the one or more second relationship computing operations comprise computing operations that are implemented to determine a data relationship such that the first data object and the third data object represent a first and second authoritative data entities, respectively, while the second and fourth data objects represent a first and second subordinate entities respectively. It is appreciated that the one or more first relationship computing operation or the one or more second relationship computing operations on the MCMOT computing operations and/or HOIR computing operations.

At block 548, the one or more data units may update, based on the first relationship type, a first status of the second data object, wherein the first status does not cause first initiation of an alert communication for transmission to one or more first computing devices.

Turning to block 550, the one or more data units may update, based on the second relationship type, a second status of the fourth data object, wherein the second status causes the first initiation of the alert communication for transmission to the one or more first computing devices or one or more second computing devices. According to one embodiment, the alert communication comprises multi-modal data including image data and/or video data and/or textual data an/or location data associated with the fourth data object. It is appreciated that the first status or the second status may include one or more flags that indicate a data state. For example, the first or second status may have a first initial data state with a visual flag "attended," which if updated, transitions from the initial data state to an updated data state with a flag "lost," depending on the computing operations from blocks 502-550 above. In some embodiments, the first relationship type or the second relationship type may comprise digital data that establishes a particular link (e.g., whether one data object depends on another data object) or absence of said link (e.g., whether one data object does not have an association or relationship with another data object.)

The various blocks of FIGS. 5A-5C may be executed in a different order from that shown in FIGS. 5A-5C. Some blocks may be optional. It is appreciated that one or more data units stored in one or more memory devices may cause one or more computing device processors to execute the various processing stages of the workflow of FIGS. 5A-5C.

These and other implementations may each optionally include one or more of the following features.

According to one embodiment, one or more of: the first data object is associated with a first person; the second data object is associated with a second person; the third data object is associated with a third person; the fourth data object is associated with a fourth person. Additionally, the substantially real-time video stream can comprise: a fifth data object that is associated with a pet; and a sixth data object that is associated with an article.

In some implementations, the substantially real-time video stream captured by the first camera in the first area, or the second camera in the first area or the second area, is captured by one or more of: one or more first cameras configured to provide one or more first views of the first data object, the second data object, the third data object, and the fourth data object; and one or more second cameras configured to provide one or more second views of the first data object, the second data object, the third data object, and the fourth data object, the one or more second cameras being positioned to provide one or more substantially top-down views of the first data object, the second data object, the third data object, and the fourth data object.

In some cases, the first area or the second area is divided into a first number of regions comprising at least a first region and a second region. Furthermore, at least a first video stream of at least a first portion of the first region is captured by the first camera, and at least a second video stream of a second portion of the second region is captured by the second camera. Additionally, the one or more data units can also implement or facilitate implementing at least one of: enable tracking a fifth data object moving from the first region to the second region; synchronize the first video stream and the second video stream to a coordinate system for enabling the tracking; and calibrate the first video stream and the second video stream to the coordinate system for enabling the tracking. It is appreciated that an occluding object can at least partially occlude the first view captured by the first camera, such that the occluding object does not occlude the second view captured by the second camera. In some embodiments, the first region is not captured by the second camera, and that the second region is not captured by the first camera. It is appreciated that the term "synchronized" as used herein can comprise temporal alignment of image capture across multiple (e.g., two or more) cameras to ensure that the multiple cameras are set to capture an image or video at a substantially exact same moment in time. It is further appreciated that the term "calibrated" as used herein comprises configuring or controlling geometric and optical properties of each camera and their spatial relationship to one another.

According to some embodiments, the one or more data units: assign, based on the one or more MCMOT computing operations, a first data object type to the first data object; assign, based on the one or more MCMOT computing operations a first bounding box to the first data object; assign, based on the one or more MCMOT computing operations a first set of location coordinates to the first data object; and assign, based on the one or more MCMOT computing operations, a first identifier to the first data object.

It is appreciated that when the one or more data units assign, based on the one or more MCMOT computing operations, the first identifier to the first data object further, the one or more data units assign, based on the first bounding box, and based on the first data object type, the first identifier to the first data object.

It is further appreciated that the one or more data units can: assign an uninitialized status to the fourth data object; and update the second status of the fourth data object based on first duration information associated with the second relationship and first distance information associated with the second relationship.

In some instances, the one or more data units: track, based on the second status, the fourth data object, determine a third relationship between the fourth data object and a fifth data object; and update the second status of the fourth data object based on whether an identifier of the fifth data object is comprised in a data record associated with the fourth data object, the data record being stored in the one or more computing databases.

Moreover, the one or more data units can include, in the alert communication: location information associated with the fourth data object; appearance information associated with the fourth data object; and the second data type associated with the fourth data object.

Additionally, the one or more data engines can access recovery information associated with the fourth data object, the recovery information comprising at least one of: location information associated with a sixth data object linked to the fourth data object; appearance information associated with the sixth data object linked to the fourth data object; or facial information associated with the sixth data object linked to the fourth data object. In some cases, the sixth data object linked to the fourth data object has an identifier that is comprised in a data record associated with the fourth data object.

These and other implementations may each optionally include one or more of the following features.

One or more of: the first data object comprises a first digital representation of a first organic entity; the second data object comprises a second digital representation of a second organic entity; the third data object comprises a third digital representation of a third organic entity; the fourth data object comprises a fourth digital representation of a fourth organic entity; and the substantially real-time video stream comprises a fifth digital representation of at least one inorganic entity. In some cases, the fourth digital representation may comprise a digital representation of a house, an article, a tree, or other inorganic objects. In addition, the substantially real-time video stream may comprise a data object that is a digital representation of a pet.

In some embodiments, the substantially real-time video stream captured by the first camera in the first area, or the second camera in the first area or the second area, is captured by one or more of: a high-angle camera configured to provide first view for streaming the first data object, the second data object, the third data object, and the fourth data object; and a top-view camera configured to mitigate against a fifth data object from occluding at least one of the first data object, the second data object, the third data object, or the fourth data object.

In some implementations, the first area or the second area is divided into n-regions with corresponding n-pairs of cameras that monitor the first area or the second area, the first camera and the second camera being comprised in the n-pairs of cameras. In particular, the first area or the second area can be segmented into n distinct regions to facilitate comprehensive monitoring of said n-regions within the first area or the second area. It is appreciated that each of these n-regions can be assigned a corresponding pair of cameras, resulting in the n-pairs of cameras collectively monitoring the n-regions in the first area or the second area. It is further appreciated that the first camera and the second camera, as referenced above, can be included within the aforementioned n-pairs of cameras, with each pair of cameras being configured to capture and provide visual data for its specific region within the n-regions associated with the first area or the second area. This setup ensures that each region within the first area or the second area is independently monitored by its dedicated pair of cameras, enabling precise and localized surveillance across part or the entirety of the first area or second area.

Furthermore, the n-pairs of cameras can be synchronized and calibrated to a common coordinate system defined for the first area or the second area, to track one or more of: the first data object while the first data object moves from a first region comprised in the n-regions to a second region comprised in the n-regions; the second data object while the second data object moves from a third region comprised in the n-regions to a fourth region comprised in the n-regions; the third data object while the third data object moves from a fifth region comprised in the n-regions to a sixth region comprised in the n-regions; or the fourth data object while the fourth data object moves from a seventh region comprised in the n-regions to an eighth region comprised in the n-regions.

In some embodiments, the one or more data units can further assign, during the one or more MCMOT computing operations: a first bounding box to the first data object; a second bounding box to the second data object; a third bounding box to the third data object; and a fourth bounding box to the fourth data object. In addition, the one or more data units may also assign, during the one or more MCMOT computing operations: a first set of location coordinates to the first data object; a second set of location coordinates to the second data object; a third set of location coordinates to the third data object; and a fourth set of location coordinates to the fourth data object. In some embodiments, the one or more data units may assign, during the one or more MCMOT computing operations: a first identifier configured to determine a link between the first data object and the second data object; and a second identifier configured to determine a link between the third data object and the fourth data object.

According to one embodiment, the first interaction comprises a first kinematic or nonkinematic relationship associated with the first data object or the second data object while the second interaction comprises a second kinematic or nonkinematic relationship associated with the third data object or the fourth data object. It is appreciated that the interactions between the first data object and the second data object can be defined, characterized, or be rule-based depending on a range of pre-established kinematic relationships. These kinematic relationships can include, but are not limited to: the first data object maintaining physical contact with the second data object; the first data object's motion corresponding to the second data object's translation (e.g., movement of the second data object from one location to another); the motion of the second data object corresponding to the first data object's translation (e.g., movement of the first data object from one location to another): or the first data object exhibiting motion associated with a different data object's velocity, such that the different data object is not the second data object.

According to one embodiment, the HOIR computing operations referenced above are based on an Intersection over Union (IoU) metric and one or more of: the first bounding box of the first data object; the second bounding box of the second data; the third bounding box of third data object; and the fourth bounding box of the fourth data object. Furthermore, the first interaction data comprises the first interaction type and the first identifier while the second interaction data comprises the second interaction type and the second identifier. The IoU metric, for example, quantifies an overlap between the first bounding box, the second bounding box, the third bounding box, and the fourth bounding box relative to a first expected bounding box (e.g., ground truth bounding box), a second expected bounding box, a third expected bounding box, and a fourth bounding box, respectively. In one embodiment, the IoU metric can have a quantitative value that ranges from 0 (e.g., indicating no overlap) to 1 (e.g., indicating a perfect overlap). This serves as a crucial evaluation method for detecting the disclosed first data object, second data object, third data object, and fourth data object. Furthermore, the term "interaction type" can represent a nature of an interaction between one or more data objects. The nature of the interaction can be: a communicative interaction type associated with any data object communicating with another data object; a functional interaction type associated with the data object manipulating or handling an object or accomplishing a task; a navigational interaction type associated with a data object moving or orienting itself in a particular direction; and a passive or observational interaction type associated with a data object not taking any actions.

In some implementations: the first status of the second data object has a first uninitialized data state; the second status of the fourth data object has a second uninitialized data state; the second data object has a corresponding first relationship record that includes the first identifier, the first identifier characterizing the first data object; and the fourth data object has a corresponding second relationship record that does not include the second identifier, such that the second identifier does not link the third data object to the fourth data object.

The first status referenced above can be updated based on determining whether: the first duration exceeds a first duration threshold; and a first computed distance associated with the first relationship record and the first data object, based on the one or more MCMOT computing operations, exceeds a first distance threshold. Similarly, the second status referenced above can be updated based on determining whether: the second duration exceeds a second duration threshold; and a second computed distance associated with the second relationship record and the third data object, based on the one or more MCMOT computing operations, exceeds a second distance threshold. The first duration or the second duration can comprise temporal windows or a period of time.

In some embodiments, the one or more data units can track the fourth data object, such that: when the fourth data object interacts with a fifth data object which does not have a third identifier in the second relationship record linking the fourth data object to the fifth data object, the second status is updated to generate a first updated second status; and when the fourth data object interacts with a sixth data object which has a fourth identifier in the second relationship record linking the fourth data object to the sixth data object, the second status is updated to generate a second updated second status.

According to one embodiment, the one or more data units may extract recovery data associated with the second relationship record, the recovery data comprising one or more of a current location of a seventh data object that is linked, based on the second relationship record, to the fourth data object; and feature data including image, video, or audio data associated with the sixth data object.

In some implementations, the alert communication comprises a multi-modal communication report including one or more of: location data associated with the fourth data object, the location data including a current location of the fourth data object; object type data associated with the fourth data object; and image or video data associated with the fourth data object; and audio data associated with fourth data object.

It is appreciated that the term optimize/optimal and its variants (e.g., efficient or optimally) may simply indicate improving, rather than the ultimate form of 'perfection' or the like.

The terminology used in this disclosure is for the purpose of describing particular exemplary embodiments and is not intended to be limiting. For example, as used herein, the singular forms "a," "an," and "the" may be intended to include plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, processes, elements, components, and/or groups thereof. The described method steps, processes, and operations are not to be construed as necessarily requiring their performance in the particular order discussed or illustrated, unless specifically identified as an order of performance. It is further appreciated that additional or alternative steps may be employed according to some implementations.

Although the terms first, second, third, etc., may be used to describe various elements, components, regions, layers and/or sections, these elements, components, regions, layers and/or sections should not be limited by these terms. These terms may be used to distinguish one element, component, region, layer or section from another element, component, region, layer or section. That is, terms such as "first," "second," and other numerical terms, when used in this disclosure, do not imply a sequence or order unless clearly indicated by the context. In addition, the term optimal and its variants (e.g., efficient, optimally, etc.) as used in this disclosure may simply indicate improving, rather than the ultimate form of 'perfection' or the like.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is appreciated that the scope of the present disclosure be limited not by this detailed description, but rather by the claims of this application. The present disclosure may be embodied in other specific forms without departing from the spirit or essential characteristics thereof. Accordingly, the above discussed subject-matter is illustrative, but not limiting, of the scope of the present disclosure, which is set forth in the following claims.

The invention claimed is:

1. One or more systems for tracking data objects, determining statuses of the data objects, and responsively controlling alert communications, the one or more systems comprising:

one or more computing databases;

one or more computing servers comprising one or more computing device processors and a memory storing instructions, the instructions being executable by the one or more computing device processors to:

receive a substantially real-time video stream captured by a first camera in a first area or a second camera in the first area or a second area;

execute one or more multi-camera multi-object tracking (MCMOT) computing operations on the substantially real-time video stream;

identify and track, based on the one or more MCMOT computing operations, a first data object in the substantially real-time video stream;

identify and track, based on the one or more MCMOT computing operations, a second data object in the substantially real-time video stream;

identify and track, based on the one or more MCMOT computing operations, a third data object in the substantially real-time video stream;

identify and track, based on the one or more MCMOT computing operations, a fourth data object in the substantially real-time video stream;

determine, based on the one or more MCMOT computing operations, that the first data object is of a first data object type;

determine, based on the one or more MCMOT computing operations, that the second data object is of a second data object type;

determine, based on the one or more MCMOT computing operations, that the third data object is of the first data object type;

determine, based on the one or more MCMOT computing operations, that the fourth data object is of the second data object type;

execute one or more human-object interaction recognition (HOIR) computing operations on at least one of: the first data object, the second data object, the third data object, and the fourth data object, or the substantially real-time video stream;

determine, based on the one or more HOIR computing operations, a first interaction associated with the first data object and the second data object;

initiate storage of, first interaction data associated with the first interaction, in the one or more computing databases;

determine, based on the one or more HOIR computing operations, a second interaction associated with the third data object and the fourth data object;

initiate storage of, second interaction data associated with the second interaction, in the one or more computing databases;

execute one or more first relationship computing operations on the first interaction data;

execute one or more second relationship computing operations on the second interaction data;

determine, based on the first interaction data, a first duration of the first interaction;

determine, based on the first interaction data, the first interaction is of a first interaction type;

determine, based on the second interaction data, a second duration of the second interaction;

determine, based on the second interaction data, the second interaction is of a second interaction type;

determine, based on the one or more first relationship computing operations, the first duration, and the first interaction type, that a first relationship between the first data object and the second data object is of a first relationship type;

determine, based on the one or more second relationship computing operations, the second duration, and the second interaction type, that a second relationship between the third data object and the fourth data object is of a second relationship type;

update, based on the first relationship type, a first status of the second data object, wherein the first status does not cause first initiation of an alert communication for transmission to one or more first computing devices;

update, based on the second relationship type, a second status of the fourth data object, wherein the second status causes the first initiation of the alert communication for transmission to the one or more first computing devices or one or more second computing devices; and access recovery information associated with the fourth data object, the recovery information comprising at least one of:

location information associated with a sixth data object linked to the fourth data object, appearance information associated with the sixth data object linked to the fourth data object, or facial information associated with the sixth data object linked to the fourth data object.

2. The one or more systems of claim 1, wherein:

one or more of:

the first data object is associated with a first person, the second data object is associated with a second person, the third data object is associated with a third person, or the fourth data object is associated with a fourth person, and the substantially real-time video stream comprises:

a fifth data object that is associated with a pet, and a sixth data object that is associated with an article.

3. The one or more systems of claim 1, wherein the substantially real-time video stream captured by the first camera in the first area, or the second camera in the first area or the second area, is captured by one or more of:

one or more first cameras configured to provide one or more first views of the first data object, the second data object, the third data object, and the fourth data object, and one or more second cameras configured to provide one or more second views of the first data object, the second data object, the third data object, and the fourth data object, the one or more second cameras being positioned to provide one or more top-down views of the first data object, the second data object, the third data object, and the fourth data object.

4. The one or more systems of claim 1, wherein:

the first area or the second area is divided into a first number of regions comprising at least a first region and a second region, at least a first video stream of at least a first portion of the first region is captured by the first camera, at least a second video stream of a second portion of the second region is captured by the second camera, and the instructions are executable by the one or more computing device processors to:

enable tracking a fifth data object moving from the first region to the second region, synchronize the first video stream and the second video stream to a coordinate system for enabling the tracking, or calibrate the first video stream and the second video stream to the coordinate system for enabling the tracking.

5. The one or more systems of claim 1, wherein the instructions are executable by the one or more computing device processors to:

assign, based on the one or more MCMOT computing operations, the first data object type to the first data object, assign, based on the one or more MCMOT computing operations a first bounding box to the first data object, assign, based on the one or more MCMOT computing operations a first set of location coordinates to the first data object, and assign, based on the one or more MCMOT computing operations, a first identifier to the first data object.

6. The one or more systems of claim 5, wherein the assign, based on the one or more MCMOT computing operations, the first identifier to the first data object further comprises assign, based on the first bounding box, and based on the first data object type, the first identifier to the first data object.

7. The one or more systems of claim 1, wherein the instructions are executable by the one or more computing device processors to:

assign an uninitialized status to the fourth data object, and update the second status of the fourth data object based on first duration information associated with the second relationship and first distance information associated with the second relationship.

8. The one or more systems of claim 1, wherein the instructions are executable by the one or more computing device processors to:

track, based on the second status, the fourth data object, determine a third relationship between the fourth data object and a fifth data object, and update the second status of the fourth data object based on whether an identifier of the fifth data object is comprised in a data record associated with the fourth data object, the data record being stored in the one or more computing databases.

9. The one or more systems of claim 1, wherein the instructions are executable by the one or more computing device processors to include, in the alert communication:

location information associated with the fourth data object, appearance information associated with the fourth data object, and the second data object type associated with the fourth data object.

10. The one or more systems of claim 1, wherein the sixth data object linked to the fourth data object has an identifier that is comprised in a data record associated with the fourth data object.

11. A method for tracking data objects, determining statuses of the data objects, and responsively controlling alert communications, the method comprising:

receiving, using one or more computing device processors, a substantially real-time video stream captured by a first camera in a first area or a second camera in the first area or a second area;

executing, using the one or more computing device processors, one or more multi-camera multi-object tracking (MCMOT) computing operations on the substantially real-time video stream;

identifying and tracking, using the one or more computing device processors, based on the one or more MCMOT computing operations, a first data object in the substantially real-time video stream;

identifying and tracking, using the one or more computing device processors, based on the one or more MCMOT computing operations, a second data object in the substantially real-time video stream;

identifying and tracking, using the one or more computing device processors, based on the one or more MCMOT computing operations, a third data object in the substantially real-time video stream;

identifying and tracking, using the one or more computing device processors, based on the one or more MCMOT computing operations, a fourth data object in the substantially real-time video stream;

determining, using the one or more computing device processors, based on the one or more MCMOT computing operations, that the first data object is of a first data object type;

determining, using the one or more computing device processors, based on the one or more MCMOT computing operations, that the second data object is of a second data object type;

determining, using the one or more computing device processors, based on the one or more MCMOT computing operations, that the third data object is of the first data object type;

determining, using the one or more computing device processors, based on the one or more MCMOT computing operations, that the fourth data object is of the second data object type;

executing, using the one or more computing device processors, one or more human-object interaction recognition (HOIR) computing operations on at least one of the first data object, the second data object, the third data object, and the fourth data object, or the substantially real-time video stream;

determining, using the one or more computing device processors, based on the one or more HOIR computing operations, a first interaction associated with the first data object and the second data object;

initiating storage of, using the one or more computing device processors, first interaction data associated with the first interaction, in one or more computing databases;

determining, using the one or more computing device processors, based on the one or more HOIR computing operations, a second interaction associated with the third data object and the fourth data object;

initiating storage of, using the one or more computing device processors, second interaction data associated with the second interaction, in the one or more computing databases;

executing, using the one or more computing device processors, one or more first relationship computing operations on the first interaction data;

executing, using the one or more computing device processors, one or more second relationship computing operations on the second interaction data;

determining, using the one or more computing device processors, based on the first interaction data, a first duration of the first interaction;

determining, using the one or more computing device processors, based on the first interaction data, the first interaction is of a first interaction type;

determining, using the one or more computing device processors, based on the second interaction data, a second duration of the second interaction;

determining, using the one or more computing device processors, based on the second interaction data, the second interaction is of a second interaction type;

determining, using the one or more computing device processors, based on the one or more first relationship computing operations, the first duration, and the first interaction type, that a first relationship between the first data object and the second data object is of a first relationship type;

determining, using the one or more computing device processors, based on the one or more second relationship computing operations, the second duration, and the second interaction type, that a second relationship between the third data object and the fourth data object is of a second relationship type;

updating, using the one or more computing device processors, based on the first relationship type, a first status of the second data object, wherein the first status does not cause first initiation of an alert communication for transmission to one or more first computing devices;

updating, using the one or more computing device processors, based on the second relationship type, a second status of the fourth data object, wherein the second status causes the first initiation of the alert communication for transmission to the one or more first computing devices or one or more second computing devices; and accessing, using the one or more computing device processors, recovery information associated with the fourth data object, the recovery information comprising at least one of:

location information associated with a sixth data object linked to the fourth data object, appearance information associated with the sixth data object linked to the fourth data object, or facial information associated with the sixth data object linked to the fourth data object.

12. The method of claim 11, wherein one or more of:

the first data object is associated with a first person, the second data object is associated with a second person, the third data object is associated with a third person, or the fourth data object is associated with a fourth person, and the substantially real-time video stream comprises:

a fifth data object that is associated with a pet, and a sixth data object that is associated with an article.

13. The method of claim 11, wherein the substantially real-time video stream captured by the first camera in the first area, or the second camera in the first area or the second area, is captured by one or more of:

one or more first cameras configured to provide one or more first views of the first data object, the second data object, the third data object, and the fourth data object, and one or more second cameras configured to provide one or more second views of the first data object, the second data object, the third data object, and the fourth data object, the one or more second cameras being positioned to provide one or more top-down views of the first data object, the second data object, the third data object, and the fourth data object.

14. The method of claim 11, wherein:

the first area or the second area is divided into a first number of regions comprising at least a first region and a second region, at least a first video stream of at least a first portion of the first region is captured by the first camera, at least a second video stream of a second portion of the second region is captured by the second camera, and the method further comprises:

enabling tracking a fifth data object moving from the first region to the second region, and synchronizing the first video stream and the second video stream to a coordinate system for enabling the tracking, or calibrating the first video stream and the second video stream to the coordinate system for enabling the tracking.

15. The method of claim 11, further comprising:

assigning, based on the one or more MCMOT computing operations, the first data object type to the first data object, assigning, based on the one or more MCMOT computing operations a first bounding box to the first data object, assigning, based on the one or more MCMOT computing operations a first set of location coordinates to the first data object, and assigning, based on the one or more MCMOT computing operations, a first identifier to the first data object.

16. The method of claim 15, wherein assigning, based on the one or more MCMOT computing operations, the first identifier to the first data object further comprises assigning, based on the first bounding box, and based on the first data object type, the first identifier to the first data object.

17. The method of claim 11, further comprising:

assigning an uninitialized status to the fourth data object, and updating the second status of the fourth data object based on first duration information associated with the second relationship and first distance information associated with the second relationship.

18. The method of claim 11, further comprising:

tracking, based on the second status, the fourth data object;

determining a third relationship between the fourth data object and a fifth data object; and updating the second status of the fourth data object based on whether an identifier of the fifth data object is comprised in a data record associated with the fourth data object, the data record being stored in the one or more computing databases.

19. The method of claim 11, further comprising, including, in the alert communication:

location information associated with the fourth data object, appearance information associated with the fourth data object, and the second data object type associated with the fourth data object.

\* \* \* \* \*